United States Patent
Reiker

(10) Patent No.: US 6,303,859 B1
(45) Date of Patent: Oct. 16, 2001

(54) ELECTRICAL BOX WITH REINFORCED AND LOCKED SUPPORT FOR CARRYING FIXTURES

(75) Inventor: Kenneth H. Reiker, Shalimar, FL (US)

(73) Assignee: Reiker Enterprises of Northwest Florida, Inc., Solvay, NY (US)

( * ) Notice: Subject to any disclaimer, the term of this patent is extended or adjusted under 35 U.S.C. 154(b) by 0 days.

(21) Appl. No.: 09/328,453

(22) Filed: Jun. 9, 1999

Related U.S. Application Data

(63) Continuation-in-part of application No. 08/862,379, filed on May 23, 1997, now Pat. No. 5,965,845, which is a continuation-in-part of application No. 08/490,757, filed on Jun. 15, 1995, now Pat. No. 5,677,512, which is a continuation-in-part of application No. 08/371,695, filed on Jan. 12, 1995, now Pat. No. 5,854,443, application No. 09/328,453, which is a continuation of application No. 08/905,077, filed on Aug. 1, 1997, now Pat. No. 5,907,124, which is a continuation-in-part of application No. 08/862,378, filed on May 23, 1997, now Pat. No. 5,909,006, and a continuation-in-part of application No. 08/862,379, filed on May 23, 1997, now Pat. No. 5,965,845, application No. 09/328,453, which is a continuation-in-part of application No. 08/862,380, filed on May 23, 1997, application No. 09/328,453, which is a continuation-in-part of application No. 08/905,141, filed on Aug. 1, 1997, now Pat. No. 6,204,450.

(60) Provisional application No. 60/023,060, filed on Aug. 2, 1996, and provisional application No. 60/018,227, filed on May 24, 1996.

(51) Int. Cl.[7] ........................... H01J 15/00
(52) U.S. Cl. ........................... 174/50
(58) Field of Search ........................ 174/51, 58, 61, 174/62, 48, 53, 57; 220/3.2, 3.3, 3.8, 3.9; 248/906, 205.3, 205.4

(56) References Cited

U.S. PATENT DOCUMENTS

| | | |
|---|---|---|
| Re. 33,147 | 1/1990 | Reiker . |
| Re. 34,603 | 5/1994 | Caison et al. . |
| 519,411 * | 5/1894 | North et al. ............... 174/62 X |
| 950,176 * | 2/1910 | Hublinger ............... 174/62 |
| 1,004,946 | 10/1911 | Wares . |
| 1,040,175 * | 10/1912 | Earhart ............... 174/62 X |
| 1,066,706 | 7/1913 | Caine . |
| 1,798,838 | 3/1931 | Garvin . |
| 1,824,708 | 9/1931 | Davis et al. . |
| 1,922,432 | 8/1933 | Gould . |
| 1,968,516 * | 7/1934 | Dieter ............... 174/62 X |
| 2,316,389 | 4/1943 | Atkinson . |
| 2,423,757 | 7/1947 | Dedge . |
| 2,528,418 | 10/1950 | Buckels . |
| 2,713,983 | 7/1955 | Kay . |
| 2,945,661 | 7/1960 | Appleton . |

(List continued on next page.)

FOREIGN PATENT DOCUMENTS 1 309 950    3/1973   (GB) .

Primary Examiner—Dean A. Reichard
(74) Attorney, Agent, or Firm—Shlesinger, Arkwright & Garvey LLP

(57) ABSTRACT

A mounting assembly includes an electrical junction box having a top wall and a side wall. The side wall extends downwardly away from the top wall and defines a cavity therein. A fixture support extends into the cavity and supports an electrical fixture. A locking or reinforcement element is provided to fixedly secure the fixture support to the junction box. The locking element is configured for preventing all relative movement between the fixture support and the box, so that the fixture support does not loosen during shipping, installation, or use. The fixture support may have exposed portions which are sufficiently smooth for preventing wear to plastic-coated electrical wires which engage such exposed surfaces of the fixture support. Two, four, or more fixture supports may be provided. Pairs of fixture supports sized for securing different types of fixtures may be provided. An adhesive element, such as double-sided tape, may be provided on the box for rapid attachment thereof to a support surface.

35 Claims, 14 Drawing Sheets

U.S. PATENT DOCUMENTS

| | | |
|---|---|---|
| 2,959,633 | 11/1960 | Palmer et al. . |
| 3,168,613 | 2/1965 | Palmer . |
| 3,340,349 | 9/1967 | Zerwes . |
| 3,518,421 | 6/1970 | Cogdill . |
| 3,616,096 * | 10/1971 | Roeder ........................ 248/205 A X |
| 3,770,872 | 11/1973 | Brown . |
| 4,050,603 | 9/1977 | Harris et al. . |
| 4,082,915 | 4/1978 | Silver . |
| 4,176,758 | 12/1979 | Glick . |
| 4,275,862 | 6/1981 | Takagi et al. . |
| 4,281,773 | 8/1981 | Mengeu . |
| 4,306,109 | 12/1981 | Nattel . |
| 4,315,100 | 2/1982 | Haslbeck et al. . |
| 4,424,406 | 1/1984 | Slater et al. . |
| 4,463,923 * | 8/1984 | Reiker .................................. 248/546 |
| 4,892,211 | 1/1990 | Jorgensen . |
| 4,909,405 * | 3/1990 | Kerr, Jr. ........................... 248/906 X |
| 4,919,292 * | 4/1990 | Hsu ....................................... 220/3.2 |
| 4,960,964 | 10/1990 | Schnell et al. . |
| 4,988,067 * | 1/1991 | Propp et al. ..................... 248/906 X |
| 5,303,894 * | 4/1994 | Deschamps et al. ............ 248/906 X |
| 5,359,152 | 10/1994 | Hone-Lin . |
| 5,435,514 * | 7/1995 | Kerr, Jr. ........................... 248/906 X |
| 5,677,512 | 10/1997 | Reiker . |
| 5,762,223 | 6/1998 | Kerr, Jr. . |
| 5,860,548 * | 1/1999 | Kerr et al. ....................... 248/906 X |
| 5,907,124 * | 5/1999 | Reiker ............................... 174/62 X |
| 5,965,845 * | 10/1999 | Reiker .................................... 174/62 |

* cited by examiner

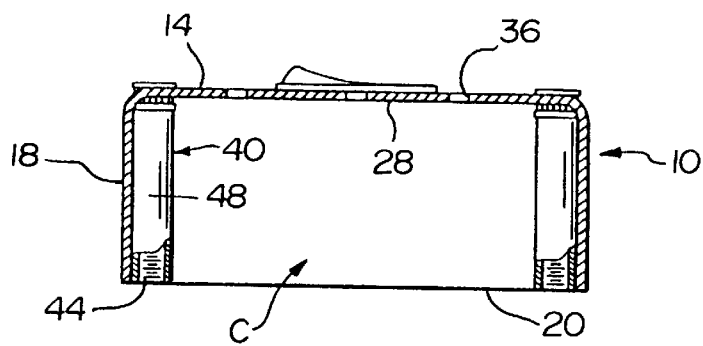
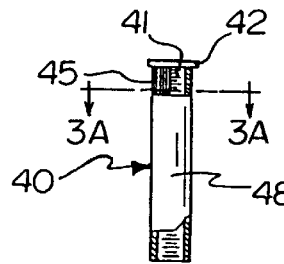
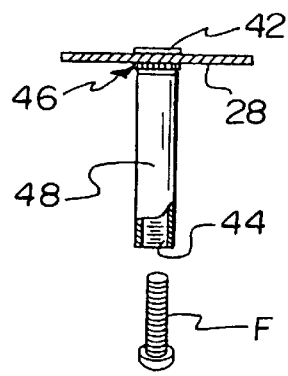
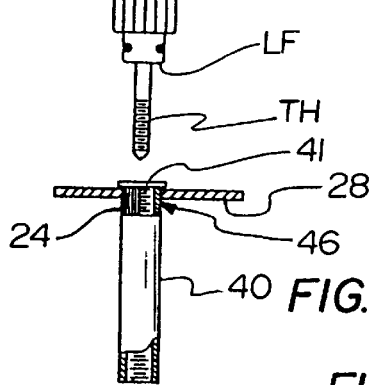
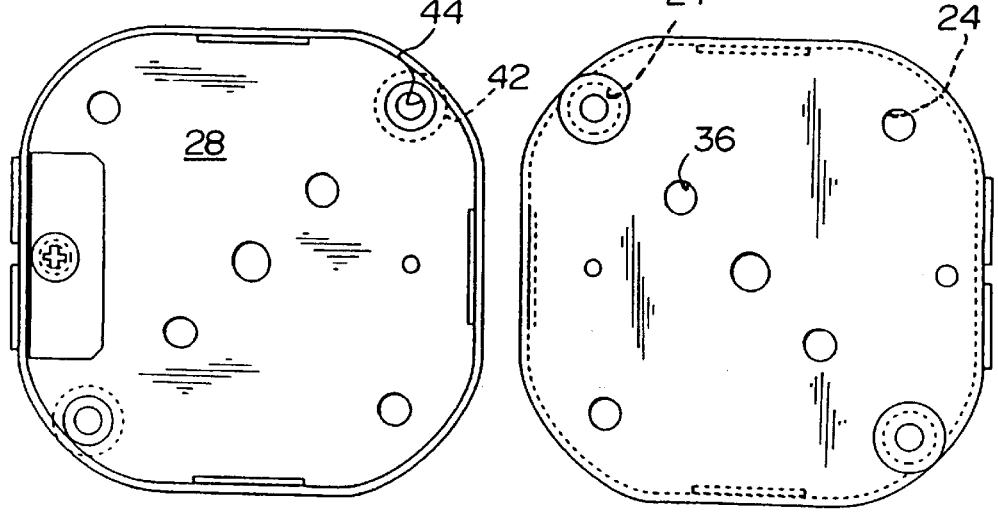

FIG. 8
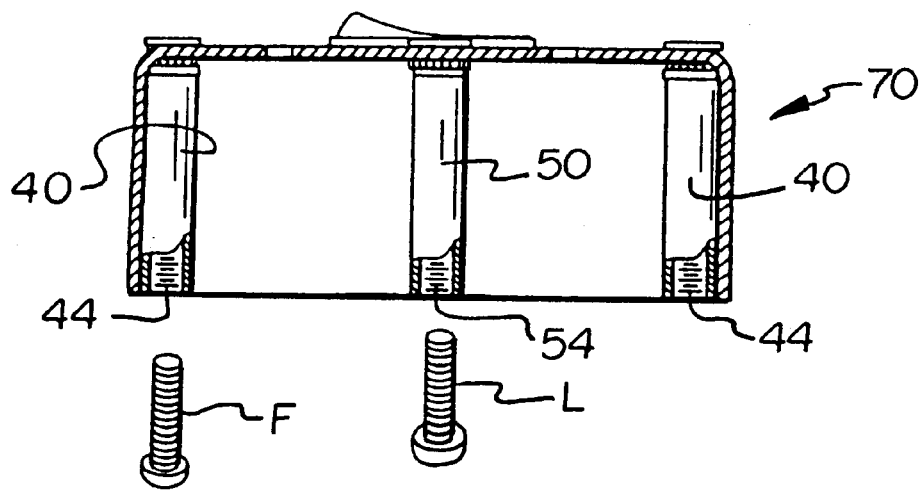
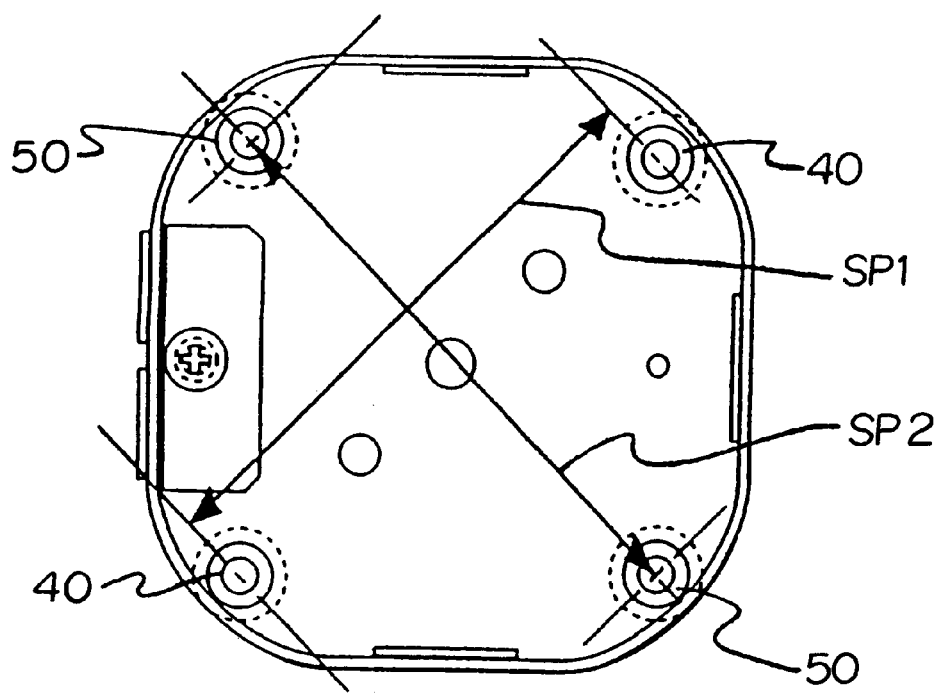
FIG. 9

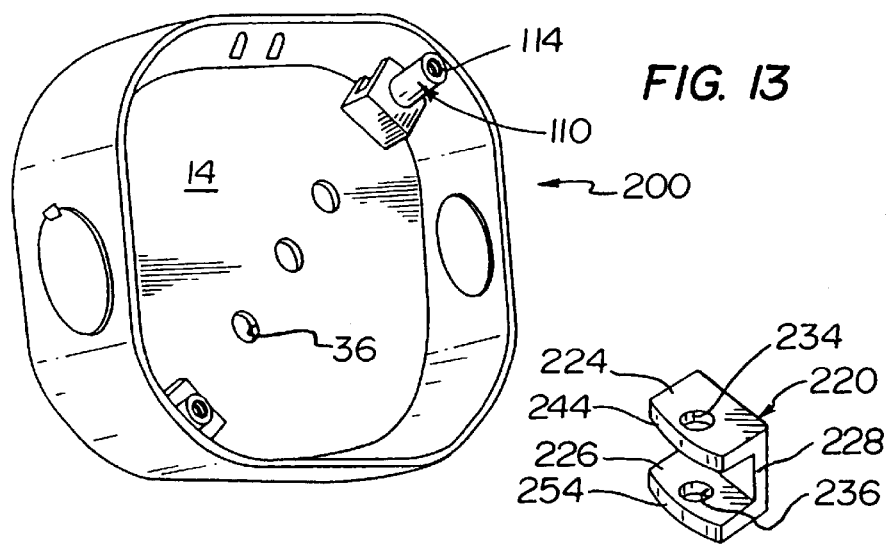
FIG. 13
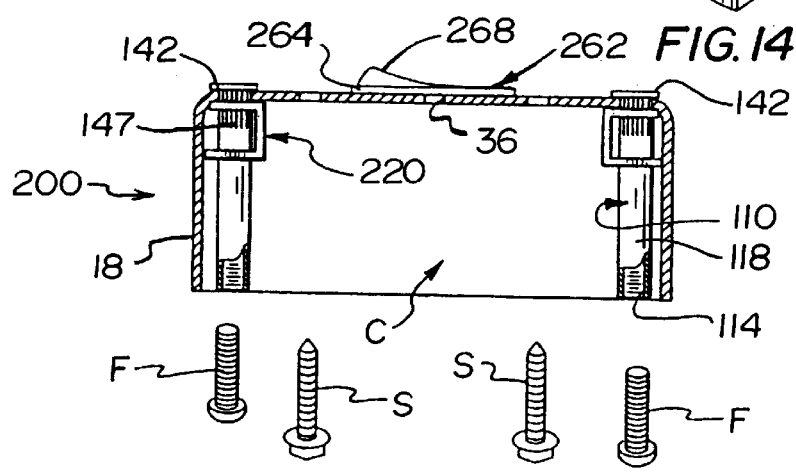
FIG. 14
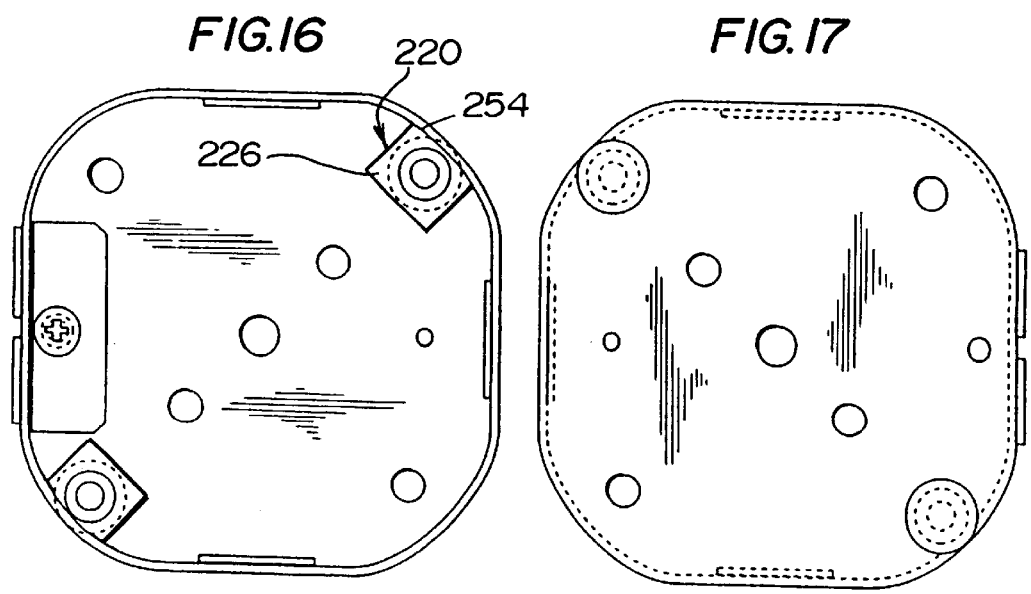
FIG. 15
FIG. 16  FIG. 17

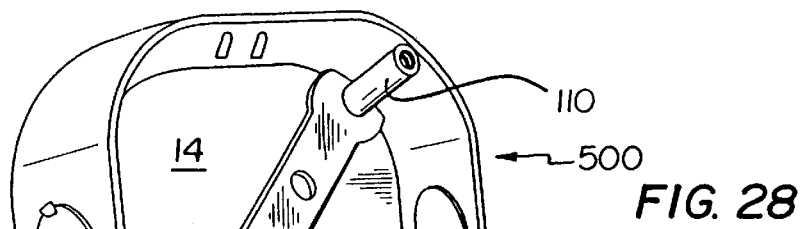
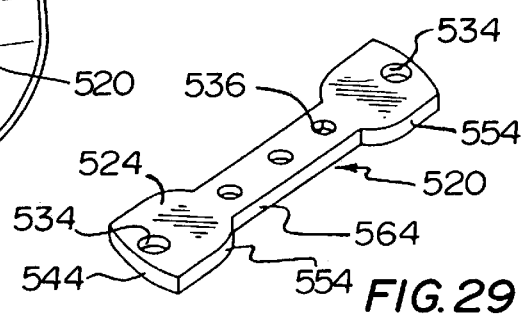
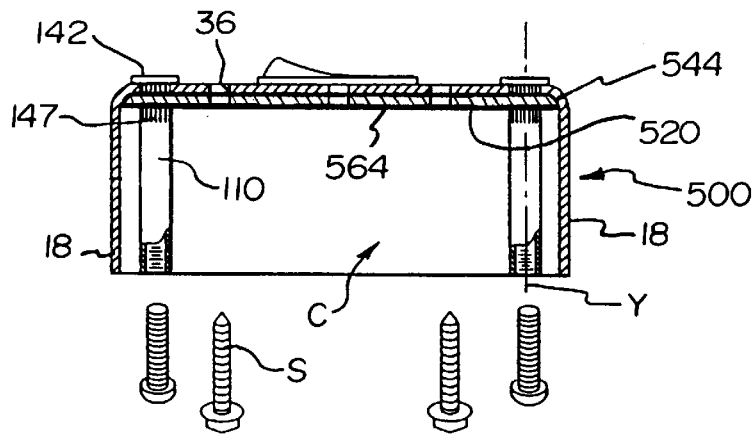
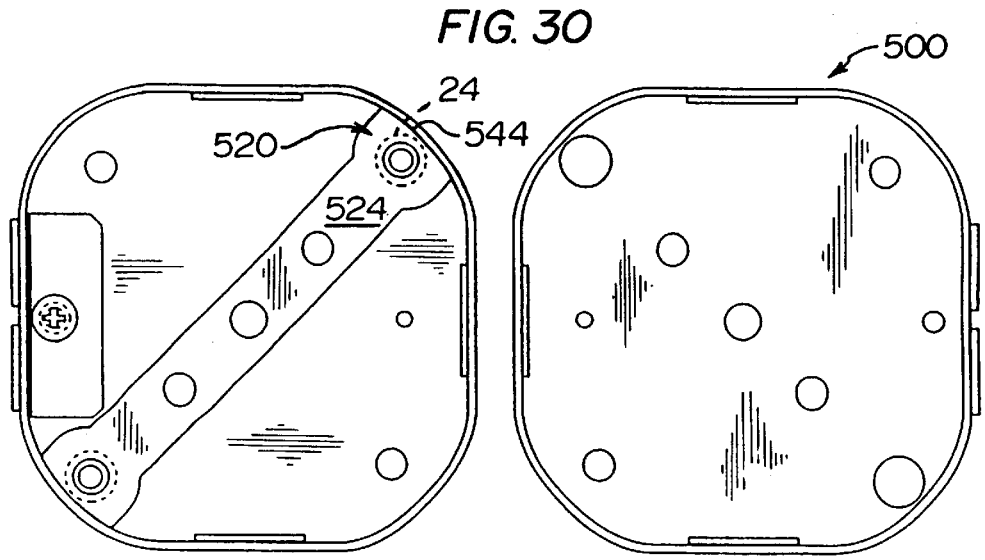
FIG.31  FIG. 32

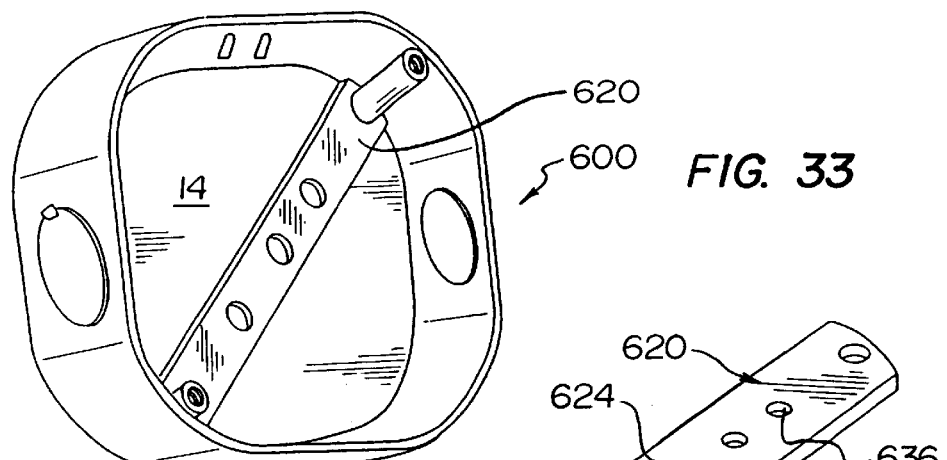
FIG. 33
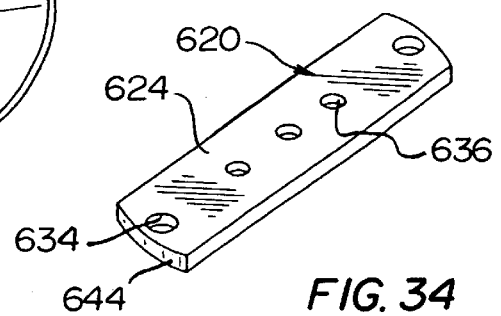
FIG. 34
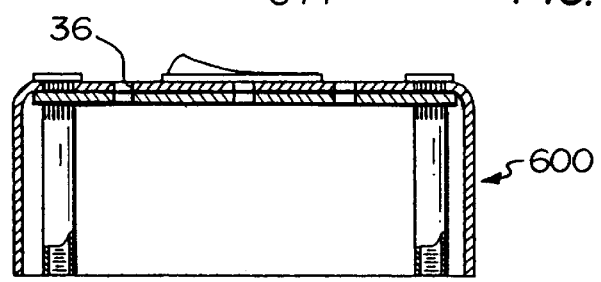
FIG. 35
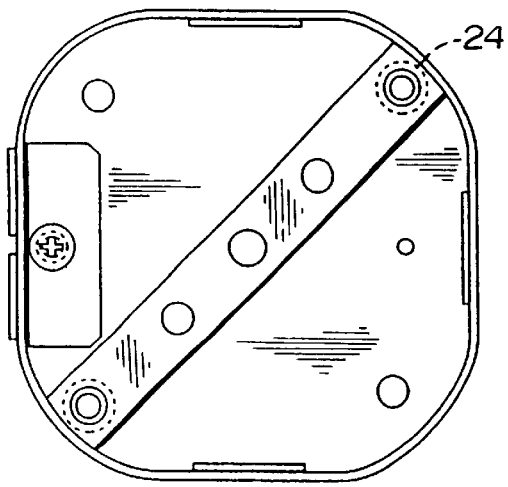
FIG. 36
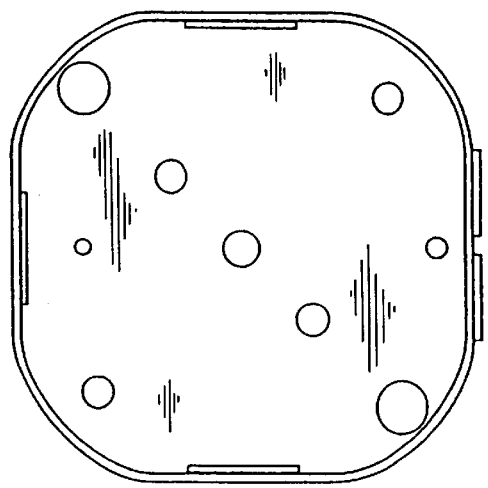
FIG. 37

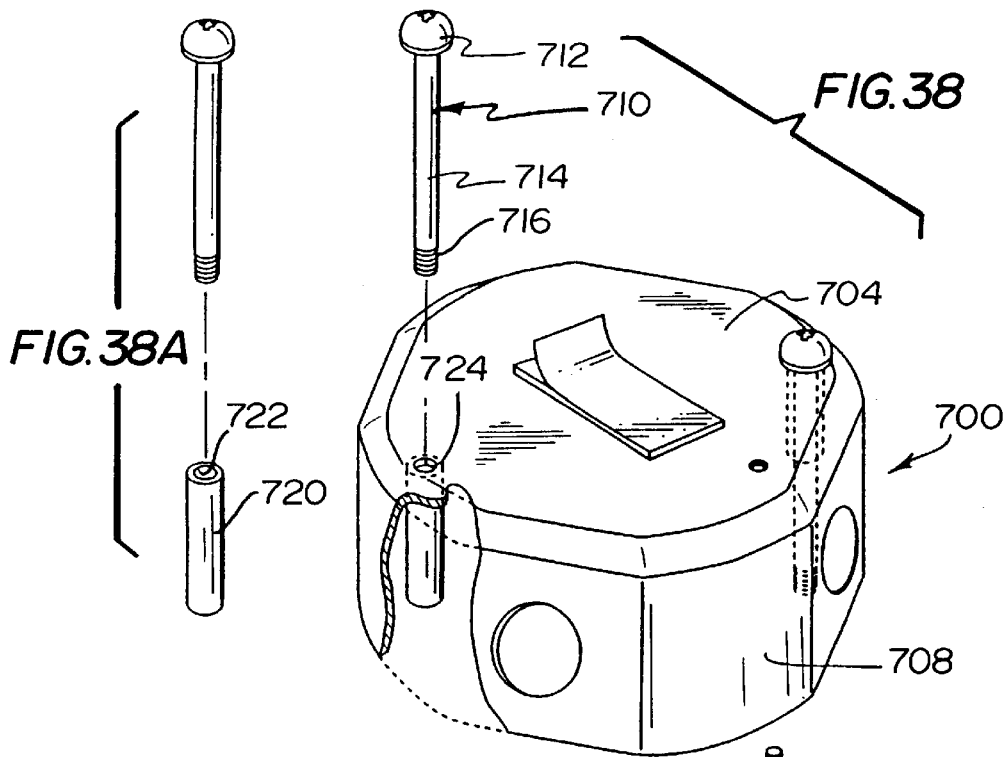
*FIG. 38*
*FIG. 38A*
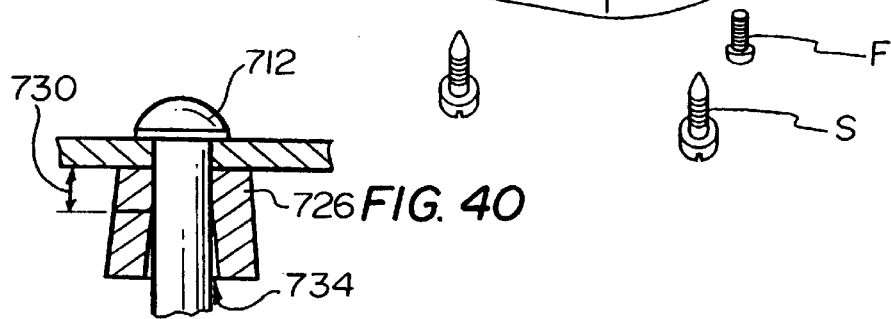
*FIG. 40*
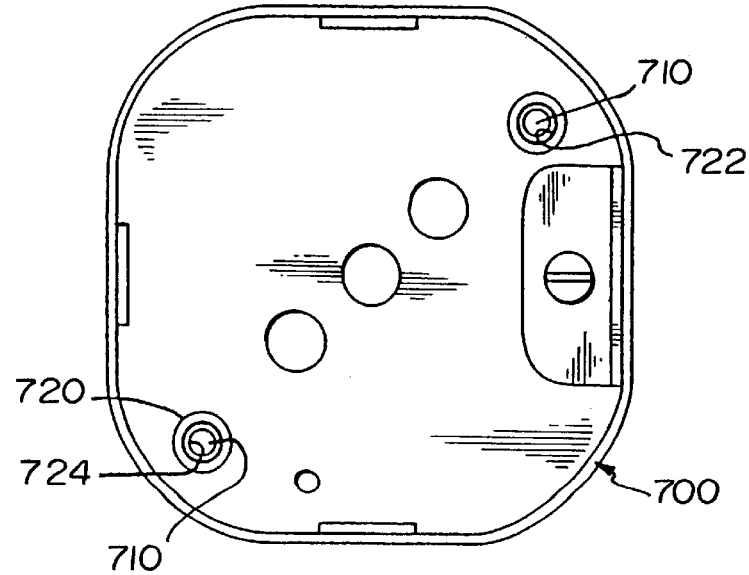
*FIG. 39*

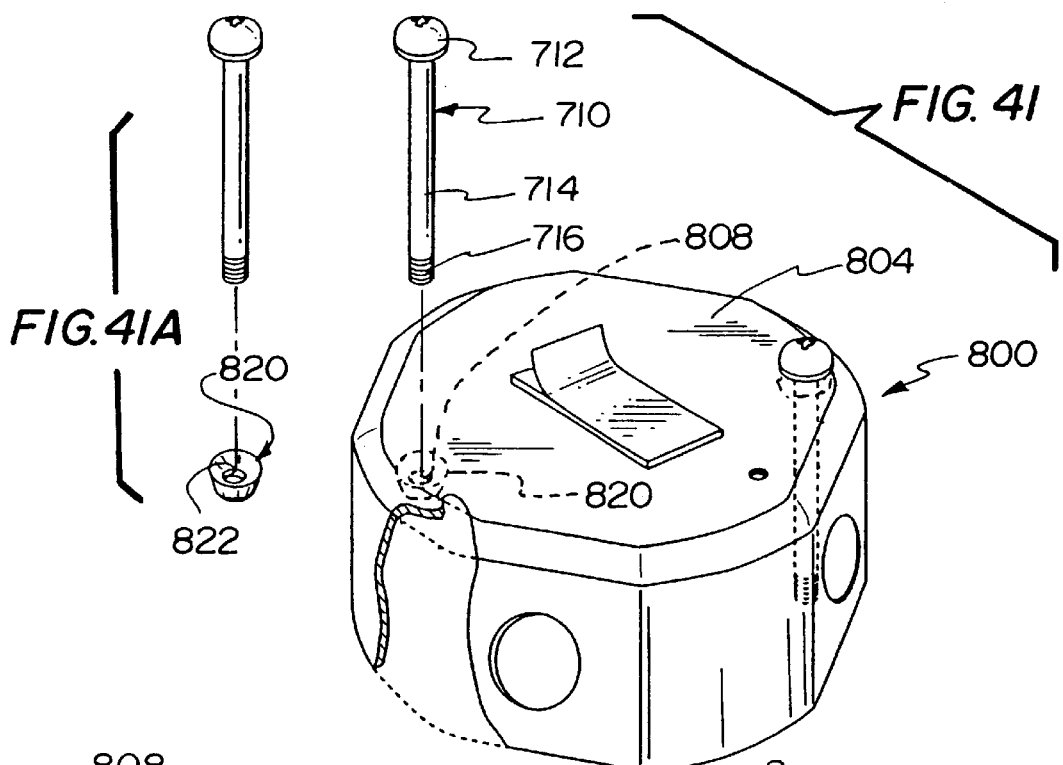
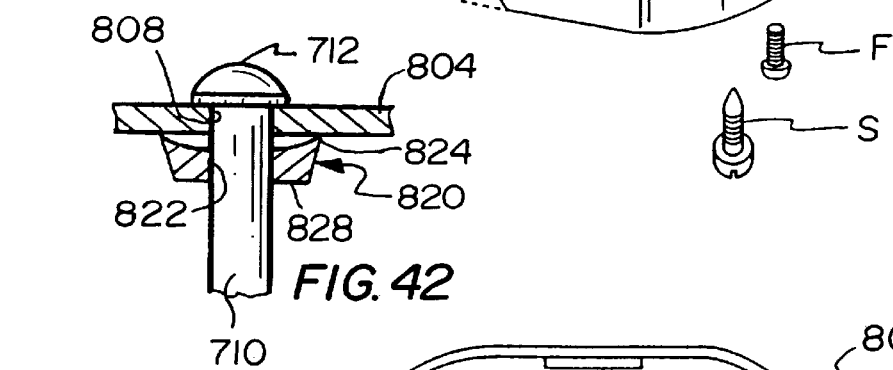
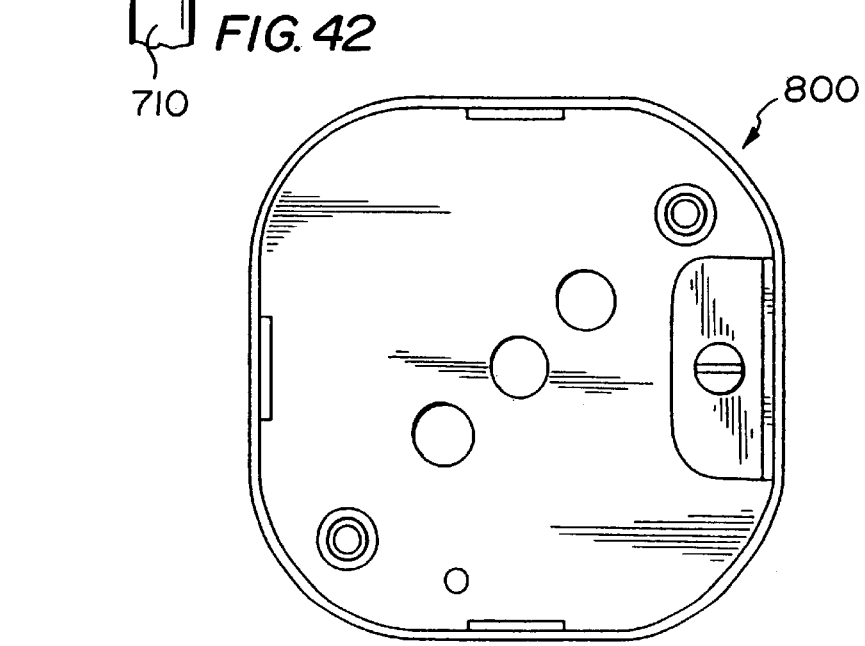

ELECTRICAL BOX WITH REINFORCED AND LOCKED SUPPORT FOR CARRYING FIXTURES

CROSS-REFERENCE TO RELATED APPLICATIONS

This application is a continuation-in-part of application Ser. No. 08/862,379, filed May 23, 1997 now U.S. Pat. No. 5,965,845, and which application Ser. No. 08/862,379, is a continuation-in-part of application Ser. No. 08/490,757, filed Jun. 15, 1995, now U.S. Pat. No. 5,677,512, which is a continuation-in-part of application Ser. No. 08/371,695, filed Jan. 12, 1995, now U.S. Pat. No. 5,854,443, and which application Ser. No. 08/862,379 claims the priority of application Ser. No. 60/023,060, filed Aug. 2, 1996 and application Ser. No. 60/018,227, filed May 24, 1996; and this application is a continuation of application Ser. No. 08/905,077, filed Aug. 1, 1997 now U.S. Pat. No. 5,907,124, which in a continuation-in-part of application Ser. No. 08/862,378, filed May 23, 1997 now U.S. Pat. No. 5,909,006, and application Ser. No. 08/905,077 is a continuation-in-part of application Ser. No. 08/862,379, filed May 23, 1997 now U.S. Pat. No. 5,965,845; and this application is a continuation-in-part of application Ser. No. 08/862,380, filed May 23, 1997, which claims the priority of application Ser. No. 60/023,060, filed Aug. 2, 1996, and which application Ser. No. 08/862,380 claims the priority of application Ser. No. 60/018,227, filed May 24, 1996; and this application is a continuation-in-part of application Ser. No. 08/905,141, filed Aug. 1, 1997 now U.S. Pat. No. 6,204,450, which claims the priority of application Ser. No. 60/023,060, filed Aug. 2, 1996; and this application claims the priority of application Ser. No. 08/905,142, filed Aug. 1, 1997, and each of which is incorporated herein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention is to provide a junction box having fixture supports for supporting at least one of light fixtures, ceiling fans, and chandeliers, for example. Another object of the invention is to provide an electrical box having at least a pair of spaced apart fixture supports, and which spaced apart fixture supports are accurately and precisely spaced apart from each other to ensure they properly mate with the mating fasteners of light fixtures, ceiling fans, and chandeliers, for example.

Another object of the invention is to provide a junction box having precise and accurate spacing between paired fixture supports that are stronger and more accurately located than prior art fixture supports, even when subjected to static and dynamic loads applied directly to the fixture supports.

Yet another object of the invention is to provide a junction box having accurately located fixture supports which are placed within the junction box "at the factory" and which stay accurately placed and strong all the way through the wholesale, retail, and transportation process until final installation by the installer.

A further object of the invention is to accurately lock added fixture supports to the junction box by locking or wedging the fixture supports and at least one of the side wall and the top wall of the junction box together.

A further object of the invention is to establish a sufficiently strong mechanical interference fit between an added fixture support and a wall of junction box so that the added fixture support is accurately and securely attached to the junction box.

Yet another object of the invention is to exploit the properties of a further reinforcement element, such as locking element or wedge, to further strengthen a connection between the added fixture support and the junction box.

Yet another object of the invention is to provide for accurate and secure placement of an added fixture support relative to top wall, as well as to the side wall of a junction box.

Another object of the invention is to provide a junction box having a fixture support therein which is accurately and securely attached to the junction box.

Another object of the invention is to provide two (2) electrical boxes in one; e.g., an installer can use the inventive electrical box to install a first type of fixture requiring a first type of fastener, and the installer can use the box to install a second type of fixture requiring a second type of fastener, so that the installer always has the proper fastener. This object also fulfills the object of reducing the amount of inventory a retailer must carry.

A further object of the invention includes making electrical boxes which use the standard punched-out, stamped electrical boxes in a more intelligent fashion.

Yet another object of the invention is to provide a standard industry size electrical box with a fixture support for supporting a fixture, and that is located the proper distance from a second fixture support, and meets National Electrical Code (NEC) standards.

Another object of the invention is to fully exploit the strength of fixture support studs, the top wall, and the side walls of electrical boxes.

A further object of the invention is to provide a junction box having fixture supports at two or four placements thereon.

A further object of the invention is to provide a junction box having four fixture supports, two fixture supports being a first type, and two fixture supports being of a second type.

A still further object of the invention is to provide a junction box suited for direct attachment to a mounting location, such as a ceiling joist, and for carrying the static and dynamic loading of a ceiling fan by itself.

Another object of the invention is to provide a junction box having a fixture support which is a rivet and/or a modified pull rivet.

Another object of the invention is to provide a junction box having a fixture support with strengthening members disposed thereon for securing the attachment of the fixture support to the junction box, as well as for enhancing the load-carrying capability of the box, such as for carrying electrical fixtures.

It is likewise an object of the invention to provide metal inserts in and/or on the electrical boxes to enhance the carrying strength of the electrical boxes.

A further object of the invention is to provide studs in the electrical boxes that enhance the carrying strength of the electrical boxes.

Yet another object of the invention is to provide studs in the electrical boxes which cover the threads of standard screws so that no screw threads are exposed in the interior of such electrical boxes.

A still further object of the invention is to provide an electrical box having a fixture support with a sufficiently smooth exterior for preventing wear to the plastic coating of plastic-coated electrical wire.

It is yet another object of the invention to provide electrical boxes in which supports, such as studs, are added during the manufacturing process to eliminate problems in prior art electrical boxes, as well as to strengthen the inventive electrical boxes.

Another object of the invention is to provide a junction box having a fixture support, yet which requires no screwing of fasteners nor welding during assembly thereof.

Yet another object of the invention is to provide an electrical box having components which are easily fabricated, added to the electrical box, and assembled in the final form by the operation of pressing or riveting, yet which do not loosen when subjected to static and/or dynamic loading.

A still further object of the invention is to provide a junction box in which the fixture support for carrying static and dynamic loads automatically extends in the desired direction along the side walls of the junction box during assembly and/or in use thanks to the fixture support being configured for engaging the side wall and/or fixture support when the support is attached and located in its attached, final form ready for use.

A still further object of the invention is to provide a junction box capable of carrying static and/or dynamic loads that has a support and that is assembled with fewer parts and with fewer steps than known devices.

It is a yet further object that all the above be carried out with an electrical box which carries the load of supported static and dynamic fixtures better than known electrical boxes.

In summary, the present invention is directed to a mounting assembly which includes an electrical junction box a top wall and a side wall. The side wall extends downwardly away from the top wall and defines a cavity therein. A fixture support extends into the cavity. Preferably, the fixture support has exposed portions which are sufficiently smooth for preventing wear to plastic-coated electrical wire which engages such exposed surfaces of the fixture support. Two or more fixture supports may be provided. An adhesive element, such as double-sided tape, may be provided on the box for rapid attachment thereof to a support surface.

The present invention is likewise directed to a mounting assembly which includes a junction box having a top wall and a downwardly extending side wall defining a cavity therein. A fixture support is provide which supports an electrical fixture, for example. The fixture support is secured to the top wall of the box by riveting the fixture fastener to the top wall of the box.

The present invention is further directed to a mounting assembly including a junction box having a top wall and a downwardly extending side wall defining a cavity therein. A fixture support extends through a hole and top wall of the junction box and is secured by press fitting a locking element substantially adjacent to the fixture support and the top wall for restricting movement of the fixture support relative to the top wall. The movement is sufficiently restricted so that the fixture support is retained in position during the standard shipping and installation process.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

BRIEF DESCRIPTION OF THE DRAWINGS

FIG. 2 is a cross sectional side view of a preferred embodiment of an electrical junction box according to the invention having two supports;

FIG. 3 is a side view, partially in section, of a fixture of FIG. 2;

FIG. 3A is a cross-sectional view of the optional fluting taken along 3A—3A of FIG. 3;

FIG. 4 is a side view, partially in section, of a method of installing the fixture support on the junction box of FIG. 2;

FIG. 5 is a side view, partially in section, of the installed fixture support of the embodiment of FIG. 2;

FIG. 6 is a bottom plan view of the junction box of FIG. 2;

FIG. 7 is a top plan view of the junction box of FIG. 2;

FIG. 8 is a cross sectional side view of a still further preferred embodiment of a junction box according to the invention that has more than two (2) fixture supports;

FIG. 9 is a bottom view of the box of FIG. 8;

FIG. 13 is a perspective view of another preferred embodiment of a junction box according to the invention;

FIG. 14 is a perspective view of a locking element of the junction box of FIG. 13;

FIG. 15 is a cross sectional side view of the junction box of FIG. 13;

FIG. 16 is a bottom view of the junction box of FIG. 13;

FIG. 17 is a top view of the junction box of FIG. 13;

FIG. 28 is a perspective view of another preferred embodiment of a junction box according to the invention;

FIG. 29 is a perspective view of locking element of the preferred embodiment of the junction box of FIG. 28;

FIG. 30 is a cross sectional side view of the preferred embodiment of the junction box of FIG. 28;

FIG. 31 is a bottom view of the preferred embodiment of the junction box of FIG. 28;

FIG. 32 is a top view of the junction box of the preferred embodiment of FIG. 28;

FIG. 33 is a perspective view of another preferred embodiment of a junction box according to the invention;

FIG. 34 is a perspective view of locking element of the preferred embodiment of the junction box of FIG. 33;

FIG. 35 is a cross sectional side view of the preferred embodiment of the junction box of FIG. 33;

FIG. 36 is a bottom view of the preferred embodiment of the junction box of FIG. 33;

FIG. 37 is a top view of the junction box of the preferred embodiment of FIG. 33;

FIG. 38 is a top perspective view of a further preferred embodiment of a junction box according to the invention;

FIG. 38A is a perspective view of components of the junction box of the preferred embodiment of FIG. 38;

FIG. 39 is a bottom view of the preferred embodiment of FIG. 38;

FIG. 40 is a partial sectional view of components of a further preferred embodiment of the invention;

FIG. 41 is a top perspective view of another preferred embodiment of a junction box according to the invention;

FIG. 41A is a view of components of the preferred embodiment of FIG. 41;

FIG. 42 is a partial cross-sectional view of components of the embodiment of FIG. 41;

FIG. 43 is a bottom view of the preferred embodiment of FIG. 41;

DESCRIPTION OF THE PRIOR ART

Figure 1:
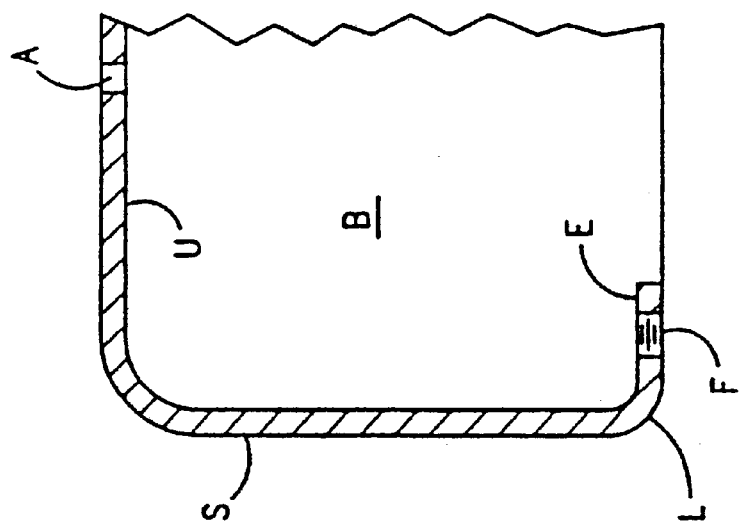
FIG. 1 is a cross sectional view of a PRIOR ART electrical junction box having an inwardly extending ear E with a fixture attachment hole F provided therein, and the hole F is typically provided with support threads the supporting length of which are limited to the thickness of the metal ear E.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, fixture or faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes B is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 $cm^2$). In addition, the carrying strength of the typically threaded hole F is limited by the thickness of the metal from which ear E is made. Consequently, ear E may only carry relatively small vertical loads, when installed against the ceiling, as described above.

As a result, local codes frequently allow such PRIOR ART boxes B to be used only for supporting the weight of a faceplate, or of a relatively light static or dynamic load, such as a light fixture or fan weighing 35 lbs. or less.

Such electrical boxes B are unsuited for supporting large static loads, as well as for supporting large dynamic loads, such as ceiling fans which may weigh sixty (60 lbs.)/twenty-seven kilograms or more (27 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

FIGS. 2 Through 7

Turning to FIGS. 2–7, a first preferred embodiment of an electrical box and/or junction box 10 according to the invention will now be described in detail.

Junction box 10 includes a top wall 14, and a side wall 18 extending downwardly therefrom and defining a cavity C therein. Side wall 18 includes a lower free edge 20.

Preferably, one or more holes or punchouts 24 are provided on top wall 14, for example.

Top wall 14 includes an inner face 28.

Additional holes or punchouts 36 for receiving portions of an electrical fixture, for example, and/or for receiving fasteners which secure junction box 10 to a ceiling or joist, for example, may likewise be provided.

FIG. 3 shows a fastener 40, such as a threaded support, a screw, bolt, or a support having a rivetable head 42. Such rivet-like supports or fixture fasteners 40 may be constructed so that, on installation, an upper region 46 of fixture support 40 compresses sufficiently for "locking" support 40 to box 10 thanks to top wall 14 of box 10 being held between compressed upper region 46 and fastener head 42. The need for such compression and the extent thereof will be determined by the materials involved, and whether an additional strengthening element is used, for example.

FIG. 4 illustrates the manner in which support 40 may be attached to box 14 by use of a powered tool P driving (e.g., pressing or riveting) support 40 into hole 24, such as likewise described in relation to FIGS. 2 and 3 of Applicant's co-pending application Ser. No. 08/905,142 filed Aug. 1, 1997, and FIGS. 2 and 3 of Applicant's co-pending application Ser. No. 08/905,141, filed Aug. 1, 1997, and each of which is incorporated herein by reference.

When threads TH of power tool P engage threads 41 and pull up rivetable head 42 against lower face LF of tool P, upper region 46 is compressed, and hence spread out or thickened against inner face 28 of top wall 14.

As best appreciated from FIGS. 2–5, when increased resistance to inadvertent turning of support 40 about the longitudinal axis of fastener 42 is desired, support 40 may be provided with an outer roughened surface or face 45, with or without fluting 47, and configured for engaging with a portion of hole 24 for restricting rotation of support 40.

As shown in FIG. 3A, configured face 45 may be made as a rough or knurled surface, with fluting 47 thereon. Such may be made as disclosed in Applicant's co-pending application Ser. No. 08/862,379, filed May 23, 1997, which is incorporated herein by reference, as well as in Applicant's co-pending application Ser. No. 08/905,142, filed Aug. 1, 1997, which is incorporated herein by reference.

The non-configured exterior face of support 40 may be made as a rounded surface 48, as shown. Good results have been achieved with individual flutes of fluting 47 being sufficiently long to extend outwardly of a typically rounded/ relatively smooth surface of hole 24.

In one embodiment, fifteen (15) to twenty (20) flutes were used on support or stud 40 having a nominal diameter of 0.25 inches (6.35 mm). There may be as few as one (1) to fourteen (14) flutes on fluting 47, for example, depending on the flute length and the intended use of the standard 4" box.

Support 40 increases the holding strength of junction box 10, as will be readily appreciated.

Support 40 may be made with a height substantially equal to the distance between lower free edge 20 and the inner face 28 of top wall 14 (i.e., the face facing cavity C).

Depending on the fixture to be installed, support 40 will be disposed completely within cavity C or will extend out past lower free edge 20. This is true for all the preferred embodiments of the invention.

Typically, a female thread 44 may be provided on a lower portion of support 40. A fastener F, such as a ceiling fan or chandelier fastener having 10–32 threads will mate therewith. Alternately, 8–32 female threads will be provided when box 10 is intended for supporting typically light fixtures (with no dynamic loads, unlike ceiling fans) that require less heavy-duty supports.

A second or third pair of spaced apart further fixture supports may be provided, as discussed immediately below.

FIGS. 8 and 9

FIGS. 8 and 9 show a further preferred embodiment of a junction box 70 according to the invention.

Further fixture supports 50 may be provided spaced apart from the paired fixture supports 40; or, further fixture supports 50 and supports 40 may be disposed at the opposite corners of box 70, as shown, or supports 40 and 50 may be substantially adjacent each other. For many applications of box 70, an important consideration is maintaining a standard offset or spacing SP1 and SP2, respectively, between the center lines of threaded holes 44,44 and between threaded holes 54,54 so that box 10 may be used for supporting lights and ceiling fans having such standard spacing.

Good results have been achieved when threaded hole 54 of fixture support 50 has a thread size which differs from the thread size of threaded hole 44 of support 40. For example, threaded hole 54 may be a 8–32 inch female thread for mating with a 8–32 male thread on fastener L, and threaded hole 44 may be provided with a 10–32 inch female thread for mating with counterpart male 10–32 inch male threads on fastener F.

In that manner, the pair of fixture support 40 would be used when the installer is mounting a ceiling fan with fasteners F, and the paired fixture supports 50 could be used when the installer is mounting a light fixture by using fastener L. In that manner, the object of providing two boxes in one so that the installer always has the correct electrical box on hand is achieved.

Junction boxes 10 and 70 may have metal walls, and supports 40 and/or 50 likewise may be made of metal. It is contemplated that top wall 14 and side wall 18 may be made of plastic, and supports 40 and/or 50 be made of metal.

It is contemplated that each of the fixture fasteners 40 and 50 have the same thread size or different thread sizes, depending on the expected use.

In the embodiments of FIGS. 2–9, when two fixture supports 40 are attached to the "left" and "right" ones of holes 24, placement of support 40 substantially adjacent side wall 18 yields the added benefit of achieving a standard center-to-center spacing between respective threads 44 of each of the two supported supports 40, even when using "standard" box forming equipment for making a standard box size, as discussed in greater detail below. Such also has the benefit of allowing use of standard equipment for forming holes in a sheetrock ceiling for receiving boxes 10 and 70.

It will be appreciated that there are advantages in restricting the tendency of support 40 and support 50 to move within a vertical plane. Such restriction helps maintain the integrity of the initial connection between supports 40 and 50 and junction box 10; e.g., the connection between both top wall 14 and supports 40 and 50, and between side wall 18 and supports 40 and 50, respectively.

Still further, restricting such tendency of supports 40 and 50 to move/rotate within a vertical plane helps to ensure that supports 40 extend substantially parallel (or at another intended angle) to side wall 18 of junction box 10 before and during use, for example. Needless to say, all those aspects of fine-tuning of the connection between supports 40 and 50 and the remainder of junction box 10 are geared for achieving strength and predictability of where the lower portion of threads 44 and 54 are.

Head 42 of support 40, for example, likewise assists in locating support 40 relative to box 10 and in restricting movement relative thereto. Head 42 may be provided with a diameter of 0.375 inches (9.525 mm) when a body with rounded surface 48 has a diameter of 0.25 inches (6.35 mm).

Needless to say, the disclosed connections and configurations act to restrict all movements between supports 40 and/or 50 and the remainder of boxes 10 and 70, respectively. The above discussion regarding restriction of movement within a "vertical" plane is merely an example.

By restricting movement of supports 40 and/or 50, there is achieved the desired predictability of where the lower portion of female thread 44, 54 is located so that the desired spacing between a left hand one of support 40 and a right hand one of support 40 is achieved. Typically, the spacing SP1 and SP2 between the commonly provided two (2) female threads 44 and 54 attached to and extending from supports 40 and 50, respectively, as shown in FIG. 9 will be achieved. Known light fixtures, for example, are provided with respective left and right male fasteners, which will be mated with such left and right female threads 44 and 54, during final use of the illustrated junction box.

All the advantages described regarding the stabilizing of and the location of threads 44 and 54 and, hence, support 40 and 50, relative to the remainder of junction box 70 hold true for all the other preferred embodiments of the invention.

When using fixture supports, such as support 40 having fluting 47, there is no need to compress support 40 along its longitudinal axis relative to head 42 and in the region of head 42, as is done with conventional rivets having no fluting 47, and as is shown in the embodiment of FIGS. 2–7. Rather, the inventive box may be assembled by inserting support 40 through hole 24. When the flutes of fluting 47 engage the inner wall defining hole 24, sufficient force will be applied on support 40 so that the outwardly extending fluting 47 engages with and/or cuts into the material of top wall 14 of boxes 10 and 70, for example.

Good results have been achieved when threaded hole 54 is provided extending at least partially through support 50, for example.

The threads of threaded hole 54 may extend substantially the entire length through support 50, so that fasteners of various lengths for attaching a light fixture or ceiling fan, for example, may be attached to support 50 and, hence, to electrical box 10, from below during use.

It is likewise contemplated that threads 54 will only be provided at the top portion of support 50, at the bottom portion of support 50, or at both top and bottom portions with an unthreaded region in between.

FIGS. 10–12A

FIGS. 10–12a illustrate a further preferred embodiment of a junction box 100 according to the invention.

Junction box 100 includes top wall 14, side wall 18, and at least one fixture support 110 disposed in hole 24 provided in top wall 14, as in the above described embodiments of the invention.

It is important to note that fixture support 110 may be a rivetable fastener, as in the embodiment of FIGS. 2 and 8, or fixture support 110 may be a non-rivetable stud which is inserted through hole 24 and is fixedly held in hole 24 without riveting.

Support 110 includes threads 114 sized to receive fixture fasteners F or L, depending on the intended use. In addition, support 110 may include a smooth lower body 118 sufficiently smooth for preventing wear to the insulation of insulation coated electrical wires disposed in cavity C during use.

Good results have been achieved when a reinforcing or locking or wedging element 120, such as the illustrated cylinder is disposed on fixture support 110. Specifically, cylindrical locking element 120 includes an outer wall 121, and an inner wall 122 which is provided adjacent the exterior surface of support 110. For example, locking element 120 may be slid over the exterior surface of fixture support 110, and press fit against the outer surface of support 110, as well as against inner face 128 of top wall 14, so that top wall 14 is securely engaged by locking element 120 and fixture support 110 engaged with locking element 120, while locking element 120 and fixture support 110 are, in turn, fixedly secured together. Fixture support 110 engages inner wall 122 thanks to a friction surface being disposed therebetween. The friction surface may constitute an interference fit between inner wall 122 and the outer diameter of support 110 over at least a portion of the region of support 110 covered by locking element 120. The friction surface may not only be a substantially smooth interference fit; in addition, the friction surface may include a roughened surface of a variety of textures. And the friction surface may include a roughened surface having a definite pattern, such as the illustrated fluting 147.

It is likewise contemplated that fixture support 110 may be provided with a head 142. In that manner, locking element 120 may be wedged against head 142 with top wall 14 therebetween, and locking element 120 may be wedged against fixture support 110, so that substantially all, if not all relative movements between top wall 14, fixture support 110, and locking element 120 are eliminated; i.e., transverse movement within all vertical planes, relative movement between fixture support 110 and top wall 14, rotational movement between locking element 120 and fixture support 110, as well as rotational movement between top wall 14 and fixture support 110, and vertical movement along the longitudinal axis Y of fixture support 110 between top wall 14 and fixture support 110, and vertical movement along the longitudinal axis Y of fixture support 110 between locking element 120 and fixture support 110, for example.

Figure 12:
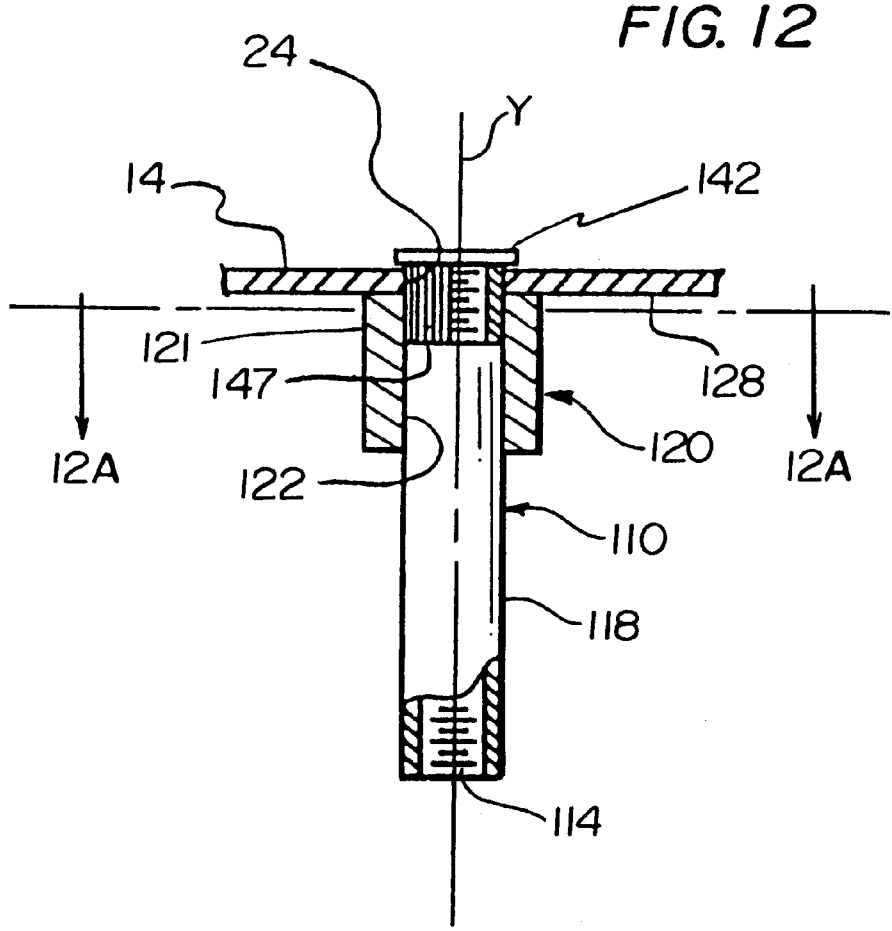
FIG. 12 is a partial side cross sectional view of a locking element press fit onto a fixture fastener of the box of FIG. 10.
Figure 12A:
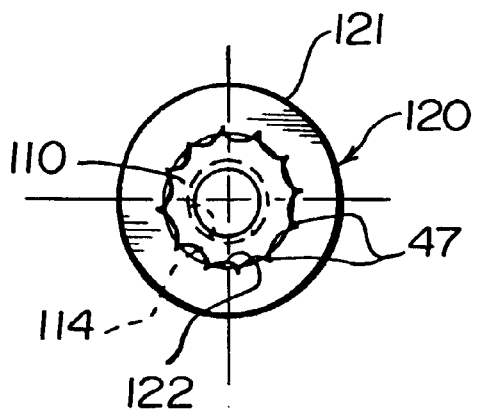
FIG. 12A is a cross sectional view taken along lines 12A—12A of FIG. 12.

It is further contemplated that fixture support 110 be provided with fluting 147 having one or more individual flutes thereon, such as illustrated in FIGS. 12A and 3A.

In the case where fluting 147 is provided on the exterior of at least an upper region of fixture support 110, for example, fluting 147 may be provided which is sufficiently long to engage at least inner wall 122 of locking element 120. Good results have been achieved when individual flutes are sufficiently long so as to cut into and mechanically engage inner wall 122 to resist rotational movement between locking element 120 and fixture support 110.

Good results have likewise been achieved when fluting 147 is made sufficiently long (i.e., extends sufficiently along the length of longitudinal axis Y of support 110) so that relative movement of locking element 120 along longitudinal axis Y of support 110 is prevented; thus, not only is locking element 120 locked to support 110 during transport and use, but owing to locking element 120 and fixture support being locked together, and owing to locking element typically abutting inner face 128 of top wall 14, fixture support 110 is likewise locked relative to top wall 14.

Hence, the desired object of achieving strength of connections between fixture support 110 and junction box 100 is achieved, as well as the object of achieving predictability of where fixture fasteners 114 will be located.

It is likewise contemplated that fluting 147 be sufficiently long so that fluting 147 engages the inner wall of hole 24 through which fixture support 110 extends. Again as with the locking and mechanical engagement between locking element 120 and fixture support 110, fluting 147 would typically be sufficiently long so as to cut into and mechanically engage the material of top wall 14 to resist rotational movement therebetween, as well as to resist vertical movement of support 110 along its longitudinal axis Y relative to top wall 14, so that the desired fixed connection does not loosen during transport and use.

It is further contemplated that the outer diameter of fixture support 110 be selected, and the inner diameter of locking element 120 (i.e., the diameter of inner wall 122) be selected so that locking element 120 and support 110 may be force fit together.

Namely, so that an interference fit between the exterior of support 110 and the inner wall 122 of locking element 120 is sufficiently tight so that the desired locking together of those two elements, as well as the locking together with the third element (i.e., top wall 14) be established, depending on the intended use.

The tolerances of the inner and outer diameters may be selected so as to achieve that goal, and/or fixture support 110 may have different configurations, such as a hexagonal configuration, or the upper region of fixture support 110 may be oversized at an upper portion thereof in the region of engagement with locking element 120 so as to achieve the desired interference fit/locking togther/wedging and achieve all the desired resistance to transverse, rotational, and vertical movement along the longitudinal axis of support 110, as discussed above.

FIGS. 13–17

FIGS. 13–17 illustrate a further preferred embodiment of a junction box 200 according to the invention.

Junction box 200 includes top wall 14 and side wall 18 jointly defining cavity C therein, as in the other preferred embodiments of the invention. Likewise, holes 24 are provided through which fixture support 110 may be inserted. And holes 36 may likewise be provided in top wall 14 for receiving fasteners S therethrough, and thereby securing junction box 200 to a joist, for example.

Fixture support 110 may include female threads 114 sized to receive the mating male thread of fastener F. Support 110 may likewise be provided with head 142 and fluting 147 as in the above-described embodiments.

Junction box 200 may also be provided with a locking element 220 for securing fixture support 110 relative to junction box 200. Specifically, locking element 220 is provided for preventing transverse, rotational, and vertical movement of support 110 relative to top wall 14, and, hence, to side wall 18 and the remainder of junction box 200. Further, locking element 220 prevents rotational, transverse, and vertical movement of fixture support 110 relative to locking element 220 itself.

Locking element 220 may be provided with an upper wall 224 and a lower wall 226. Lower wall 226 may be spaced apart from upper wall 224. A side wall 228 may be provided for securing upper wall 224 to lower wall 226. An upper hole, 234 may be provided for receiving fixture support 110 therein. Likewise, depending on the intended use, a lower hole 236 may be provided in lower wall 226 for receiving support 110 therein.

Upper wall 224 may be sized for being disposed substantially adjacent the radiused corner between top wall 14 and side wall 18 of junction box 200. Lower wall 226 may be sized so as to abut side wall 18, in which case lower wall 226 may assist in preventing movement of support 110 relative to box 220, as well as to enhance the dynamic and static load-carrying capacity of fixture 110 during use.

In addition, a contoured face 244 may be provided on upper wall 224 and a contoured face 254 may be provided on lower wall 226. Contoured faces 244 and 254 are useful when it is desired to have locking elements 220 abutting side wall 18 in a curved region of side wall 18, as illustrated.

Figure 10:
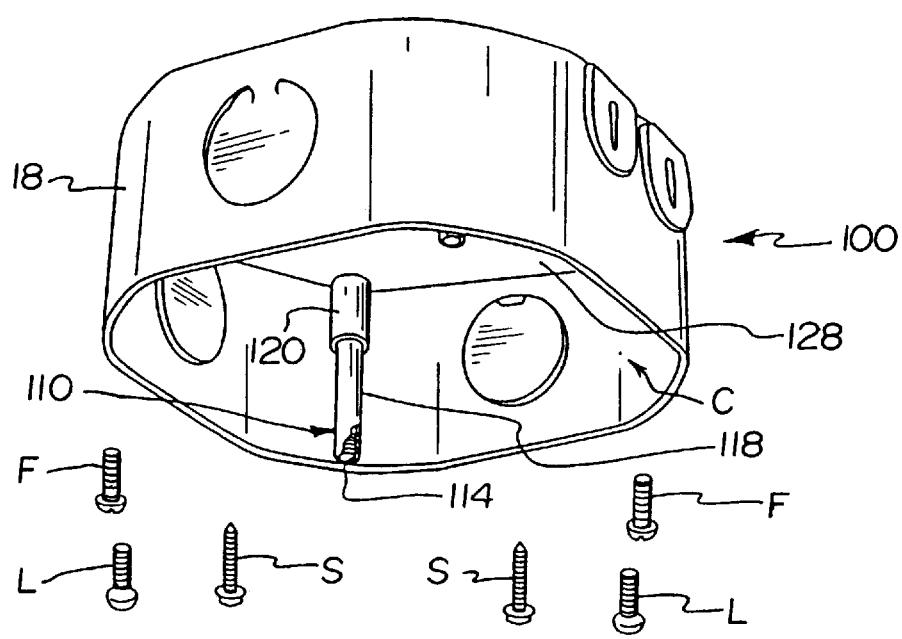
FIG. 10 is a perspective view of another preferred embodiment of a junction box according to the invention.
Figure 11:
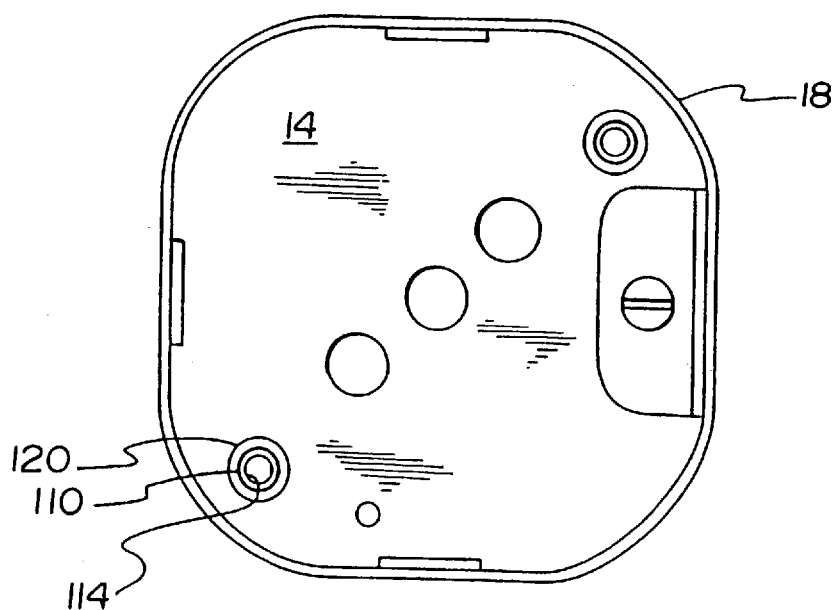
FIG. 11 is a bottom view of the box of FIG. 10.

During assembly, locking element 220 may be press fit onto fixture support 110 in a manner analogous to the press fitting of locking element 120 onto fixture support 110 in the embodiment of FIG. 10, as described in detail above. In short, hole 234 may be sized so that individual flutes of fluting 147 cut into or mechanically engage in the material of upper wall 224.

As illustrated, when fluting 147 does not extend down as far as lower wall 226, lower hole 236 may be sized so that there is an interference fit between the outer diameter of support 110 and the diameter of hole 236 to further secure fixture support 110 relative to junction box 200. It is likewise contemplated that no interference fit be provided between hole 236 and support 110; rather, a relatively close or snug fit, for example, between side wall 18, contoured face 254, hole 236, and support 110, coupled with lower wall 226 being fixedly attached to upper wall 224 by means of side wall 228 will still assist in resisting at least transverse movement between fixture support 110 and the remainder of junction box 200.

All the variations above describe regarding flutings 147 and the other preferred embodiments of the locking elements 110, for example are likewise applicable to locking element 220.

Junction box 200 may include a piece of double-sided tape 262 on top wall 14 thereof. Double-sided tape 262 may be provided with an adhesive portion 264 and a protective strip or layer 268 on the outer face thereof, i.e., on the face of adhesive portion 264 of double-sided tape 262 that has not been adhered to junction box 200. Conventional double-sided tape 262 may be used.

Alternative means for adhering junction box 200 to a surface may be used, such as spray-on adhesive, a piece of putty and other adhering means. Each of those adhering means is as described in my earlier U.S. patent application Ser. No. 08/490,757, filed Jun. 15, 1995, now U.S. Pat. No. 5,677,512, which is a continuation-in-part of Ser. No. 08/371,695, filed Jan. 12, 1995, now U.S. Pat. No. 5,854,443, each of which is incorporated herein by reference, and may be utilized in conjunction with or instead of the double-sided tape 262.

One of the many advantages of junction box 200 is that the user may remove protective layer 268, and then adhere an outer face of adhesive portion 264 of double-sided tape 262 to the surface to which junction box 200 is to be attached. Double-sided tape is selected and sized so that sufficient holding power for temporarily adhering or affixing junction box 200 to the surface is achieved, while the user has both hands free for permanently attaching junction box 200 in the desired location by hammering nails (or shooting screws) through one or more holes 36.

Preferably, the adhesive is sufficiently strong to adhere box 200 to a horizontal surface located above the user's head, and for a sufficiently long period of time so that the user may release box 200 after adhering box 200 to a ceiling or wall, locate a fastener (e.g., nail or screw), and still have enough adhering time left to use both of his or her hands to install the fastener by hammering, screwing, or the like.

The thickness of double-sided tape 262 may be coordinated with the thickness (i.e., height) of any unillustrated outwardly extending top wall protrusions, such as head 142 of fixture support 110, as necessary.

In addition, it is contemplated that the thickness of tape 262 will be varied depending on the characteristics of the surface of the material to which junction box 200 is to be adhered.

FIGS. 18–22

FIGS. 18–22 illustrate another preferred embodiment of a junction box 300 according to the invention.

Junction box 300 includes some features from the embodiments described above. For example, junction box 300 may include fixture support 110 having female threads 114 at a lower end thereof. As in the other embodiments. Threads 114 may be sized to mate with fixture fastener F having 10–32 threads thereon of the type for supporting ceiling fans and chandeliers, for example.

It is further contemplated, as in the other embodiments, that a further pair of fixture supports 110 be provided at spaced apart, opposed corners of box 300, in the manner similar to the embodiment of FIGS. 8 and 9, as will be readily appreciated. Such a further pair of spaced apart supports would typically be provided with a different thread size, such as 8–32 female threads, for receiving a mating fastener L for securing a light fixture thereto, for example.

Box 300 includes a reinforcement or locking element 320 including a plate 324 having an opening 334 therethrough. Opening 334 may be provided with a side opening 338 opening toward a contoured face 344 of plate 324.

In that manner, contoured face 344 may abut the inner face of wall 18 that faces toward cavity C. Thus, as required, fixture support 110 may be located close to side wall 18, and fixture support 110 can even be provided directly abutting the inner face of side wall 18. By having one or both of fixture supports 110 abutting the inner face of side wall 18, it will be appreciated that the spacing between paired fixture supports 110 may be increased, the outer diameter of fixture supports 110 may be increased, or the outside width of box 300 may be reduced (i.e., the distance between the opposed outer faces of opposed side wall 18 of box 300 that are adjacent to the paired opposed fixture supports 110.

One or more side faces 354 may likewise be provided on locking element 320. Side faces 354 may be angled, as desired, depending on strength requirements. Likewise, by angling faces 354 inwardly, as illustrated, the available volume of cavity C is increased.

During assembly of box 300, locking element 320 may be press fit on fixture support 110 and secured thereto by roughened surface or fluting 147, as in the other preferred embodiments.

FIGS. 23–27

Turning to FIGS. 23–27, a further preferred embodiment of a junction box 400 is illustrated.

Junction box 400 has some features in common with the other preferred embodiments of the invention, as will be readily appreciated.

Figures 26, 27:
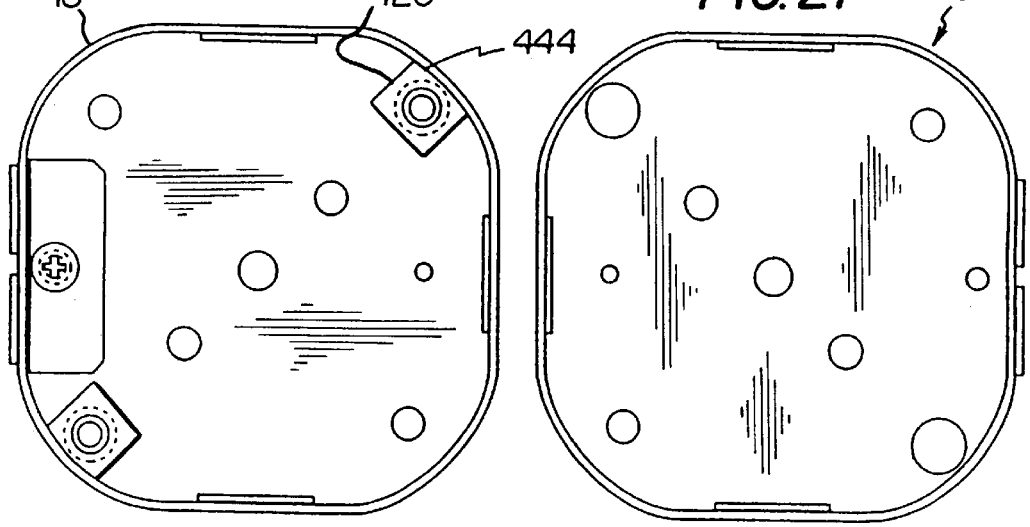
FIG. 26 is a bottom view of the preferred embodiment of the junction box of FIG. 23.
FIG. 27 is a top view of the junction box of the preferred embodiment of FIG. 23.

A locking element 420 may be provided having a plate 424 with a hole 434 therein. Locking or reinforcing element 420 may include a face 444, which may be a contoured face, so that face 444 may abut the inner face of side wall 18, as best seen in FIG. 26.

Locking element 420 may be press fit or otherwise engaged with roughened surface or fluting 147 of support 110, as described in detail above in connection with the other preferred embodiments.

FIGS. 28–32

FIGS. 28–32 show another preferred embodiment of a junction box 500 according to the invention.

Junction box 500 includes some of the features of the other preferred embodiment of the invention, which features are not separately numbered.

A locking or reinforcing or wedging element 520 may be provided. Locking element 520 may include a plate 524 which extends substantially across the width of box 500. One or more holes 536 may be provided in plate 24. Conveniently, one or more holes 536 align with respective holes 36 in top wall 14 of box 500 so that, in use, fasteners S may extend therethrough for securing box 500 to a support, such as a joist.

Additional openings 534, such as the illustrated holes, may be provided and sized for receiving fixture support 110 therethrough.

Plate 524 may further include one or more faces 544, which may be contoured for abutting the inner face of side wall 18 of box 500. Further, enlarged portions 554, which likewise may be contoured, may be provided in the region of hole 534, for example. A connecting member 564, such as the illustrated straight plate extending between opposed enlarged regions 554 may be provided for making locking element 520 into an integral part.

Thus, given connecting member or plate 564, locking element 520 is particularly suited for preventing movement of fixture support 110 relative to or about its longitudinal axis Y; e.g., preventing transverse movement of support 110 within vertical planes containing longitudinal axis Y.

As viewed in FIG. 30, connecting plate 564 prevents movement by the right one of fixture support 110 toward the left side of box 500 thanks to connecting plate 564 providing a rigid connection between the right hand enlarged portion 554 and the left hand enlarged portion of 554. Left hand enlarged portion 554 is, as will be readily appreciated, prevented from movement to the left not only by the abutment of face 554 against the left hand inner face of side wall 18, but by the left hand fixture support 110.

The other possible vertical, rotational, and transverse movements, for example, of fixture support 110 are prevented owing to the secure connections between top wall 14, head 142, fluting 147, and fixture support 110, as described in detail above in connection with this and the other embodiments.

The reduced size of connecting plate 564 also requires less material be used for locking element 520, and provides for a greater usable volume in cavity C.

FIGS. 33–37

FIGS. 33–37 show another preferred embodiment of a junction box 600 according to the invention.

Junction box 600 has elements similar to those shown above, and includes a locking or reinforcement element 620 for enhancing the rigidity and stability, for example, of fixture support 110, as in the other preferred embodiments of the invention.

Locking element 620 includes a plate 624 having one or more openings 636 therein. Opening 636 may be holes, as shown. One or more openings or holes 634 may likewise be provided. Holes 636 are sized for being aligned with hole 36 in top wall 14, and openings 634 are sized for mating with fixture support 110. All the benefits of the preferred embodiment of FIGS. 28–32 are realized by junction box 600, as well as the benefits of the other preferred embodiments.

FIGS. 38–40

FIGS. 38–40 illustrate another preferred embodiment of the junction box 700 according to the invention.

Box 700 may include elements similar to those shown in the preferred embodiments above, as will be readily appreciated. Junction box 600 includes a top wall 704 and a downwardly extended side wall 708 defining a cavity therein.

In order to provide support for an electrical fixture, one or more fixture supports 710 may be provided. Fixture support 710 may include an upper engaging member 712 for engaging top wall 704 of box 700. Support or engaging element 712 may be in the form of a bolt head or screw head, for example. A fixture engaging member, such as the illustrated elongated body 714 may likewise be provided on support 710. Depending on the type of fixtures to be supported, a partially threaded region 716 may be provided thereon. Preferably, to avoid wear to insulation and wire inside the cavity of box 700, when in use. Elongated body 710 may be substantially free of abrasive or roughened surfaces, such as fasteners, at least within the cavity of box 700, as will be appreciated from the discussion of the benefits of having substantially smooth exposed surfaces within the various junction boxes described above.

A securing or locking element 720 may be provided for enhancing the engagement between fixture support 710 and the remainder of box 700. Locking element 720 may be provided with an opening 722 therein that is configured for receiving and engaging a portion of support 710, such as elongated body 714. As shown, opening 722 may be a completely closed-wall hole 722. Yet, it is expected that opening 722 may be partially closed, such as shown and described in connection with reinforcement or locking element 320 of FIG. 19 above.

Locking element 720 may be provided with inwardly sloped portions at an upper region 726 thereof, as shown in FIG. 40, which inwardly sloped regions established contact over a region 730 near top portion 726. A gap 734 may be defined between body 714 and a lower portion of fixture support 710, for example. In some cases, the establishment of a tight fit for wedged engagement in upper region 726 establishes the desired restriction, and the prevention, of relative movement between fixture support 710 and the remainder of the box, thanks to top wall 704 being tightly wedged between head 712 and upper region 726.

Figure 19:
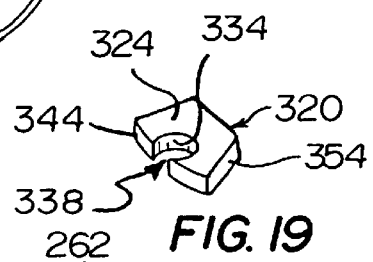
FIG. 19 is a perspective view of locking element of the preferred embodiment of the junction box of FIG. 18.
Figure 20:
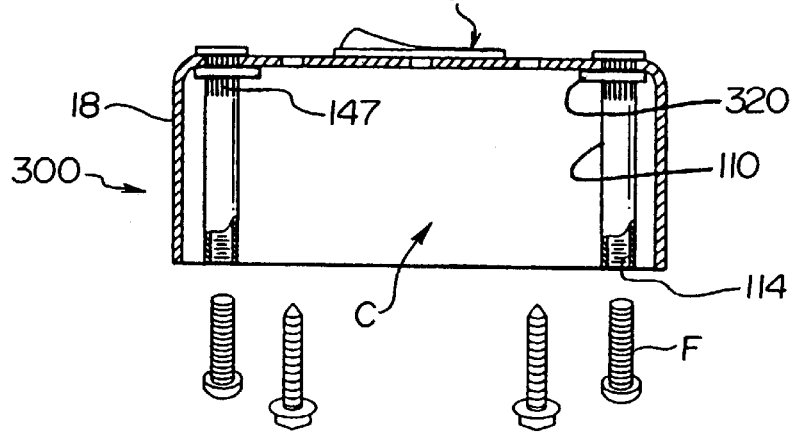
FIG. 20 is a cross sectional side view of the preferred embodiment of the junction box of FIG. 18.
Figure 21:
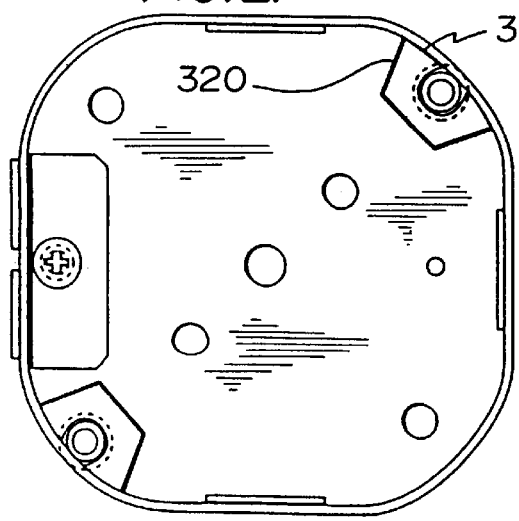
FIG. 21 is a bottom view of the preferred embodiment of the junction box of FIG. 18.
Figure 22:
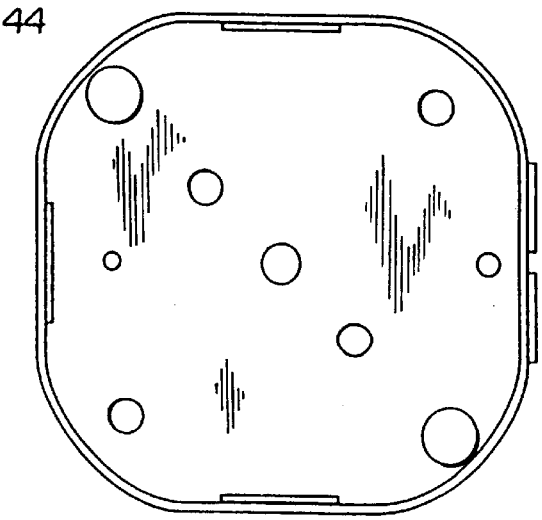
FIG. 22 is a top view of the junction box of the preferred embodiment of FIG. 18.
Figure 23:
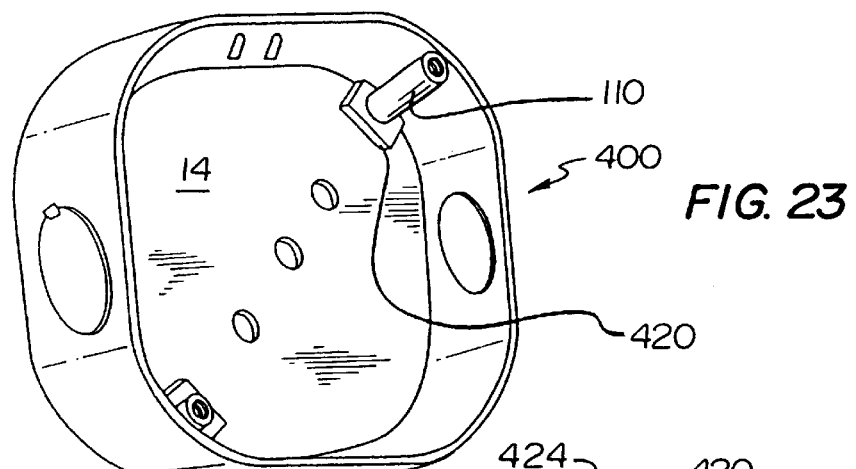
FIG. 23 is a perspective view of another preferred embodiment of a junction box according to the invention.
Figure 24:
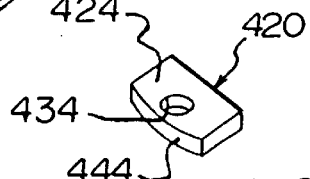
FIG. 24 is a perspective view of locking element of the preferred embodiment of the junction box of FIG. 23.
Figure 25:
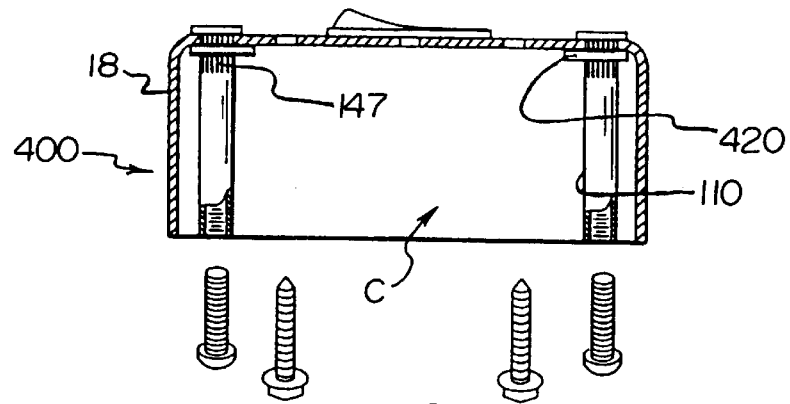
FIG. 25 is a cross sectional side view of the preferred embodiment of the junction box of FIG. 23.

It is contemplated that other reinforcing and locking elements, such as locking element 120 of FIG. 12 and locking element 320 of FIG. 19, for example be used instead of or in conjunction with locking and reinforcing element 720. Those are merely examples of substitutions, and other substitutions and modifications within the scope of the invention are likewise contemplated.

FIGS. 41–43

FIGS. 41–43 shows another preferred embodiment of a junction box 800 according to the invention.

Junction box 800 includes a top wall 804 having one or more openings or holes 808 therein. A fixture support, such as fixture support 710 of the preferred embodiment of FIG. 38 may extend through opening 808 for securing an electrical fixture to box 800, in use. As described above, support 710 may include a stabilizing element such as head 712, body 714, and threaded portion 716.

The shape and size of opening 808 may be selected for fixedly engaging with body 714 of support 710. As in the other embodiments, it is preferred that fixture support 710 be fixedly secured to the remainder of box 800. To enhance the engagement of support 710 with top wall 804, for example, a reinforcing or locking element 820 having an opening 822, such as a hole therethrough, may be provided. Locking element 820 may have relatively thin-walled upper portions 824 and a lower face 828. In use, locking element 820 may be press fit up against the inside of top wall 804 for wedging wall 804 between head 712 and locking element 820. Relatively thin-walled portions 824 may be selected and sized so as to enhance the resiliency and/or wedging action of locking element 820 for securing the engagement thereof relative to fixture support 710, wall 804 and head 712, for example. As will be appreciated, fixture support 710 extends through opening 808 of top wall 804 and through opening 822 in locking element 820.

Figure 44:
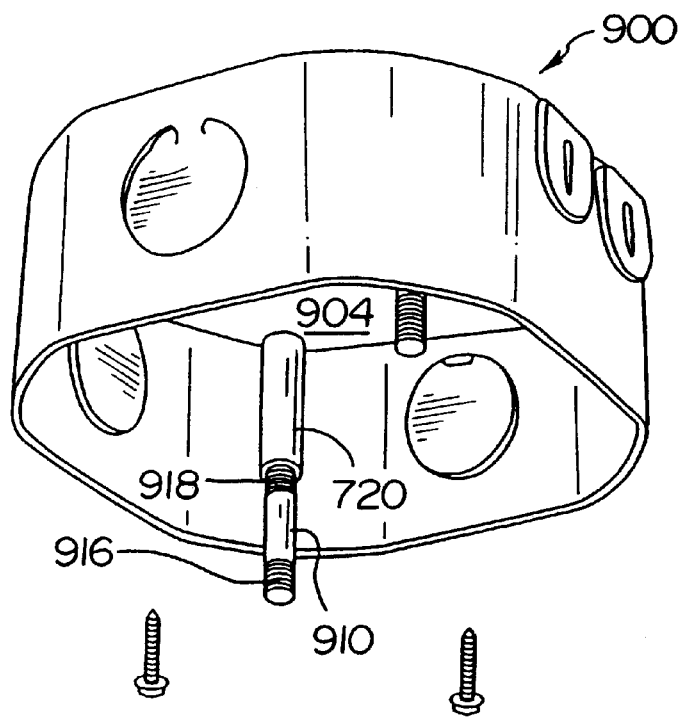
FIG. 44 is a perspective view of yet another preferred embodiment of a junction box according to the invention.
Figure 45:
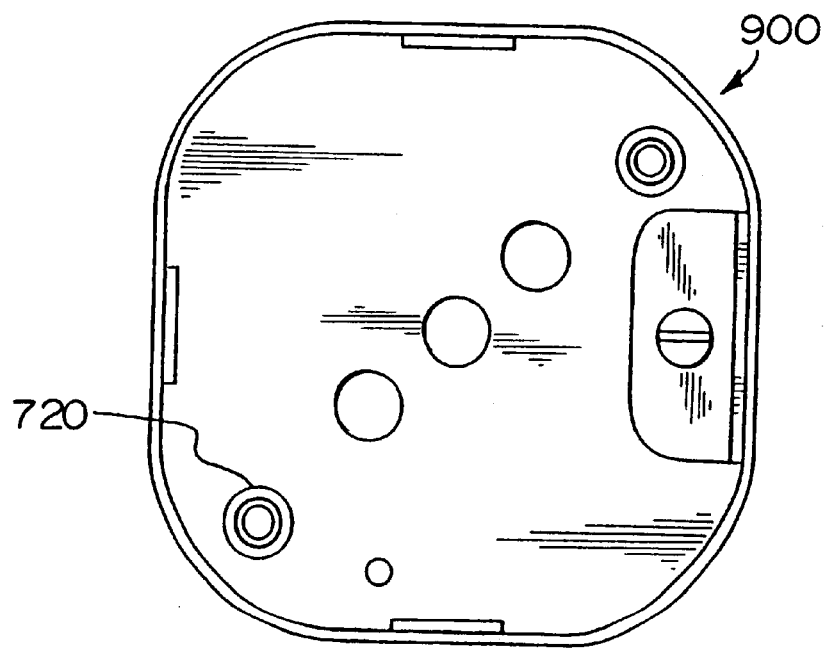
FIG. 45 is a bottom view of the preferred embodiment of FIG. 44.

FIGS. 44 and 45

FIGS. 44 and 45 illustrate a further preferred embodiment of a junction box 900 according to the invention.

Junction box 900 may be made in a fashion similar to junction box 700 of FIG. 38, such as by using locking or reinforcing element 720 thereof.

In addition, one or more fixture supports 910 may be provided that are secured to upper wall 904 and box 900 by locking element 720, as in the embodiment of FIG. 38, for example. Fixture support 910 may include one or more threaded portions 916 and 918. The illustrated upper threaded region 918 may be useful when securing various types of electrical fixtures to box 900, or may be used for securing additional locking elements, such as a lock nut, for example. In the case where no additional lock nuts or portions of a supported electrical fixture to cover some or all of exposed threads 918, any exposed portion of thread 918 will typically be selected so that the overall exposed region of locking element 720 and fixture support 910 within the cavity of box 900 is sufficiently free of exposed threads or other abrasive elements to avoid wear to insulation or wiring disposed within cavity C in use, as discussed variously above. Fixture support 910 may be disposed completely within, or may extend outwardly of the cavity of box 900, as shown.

Figure 46:
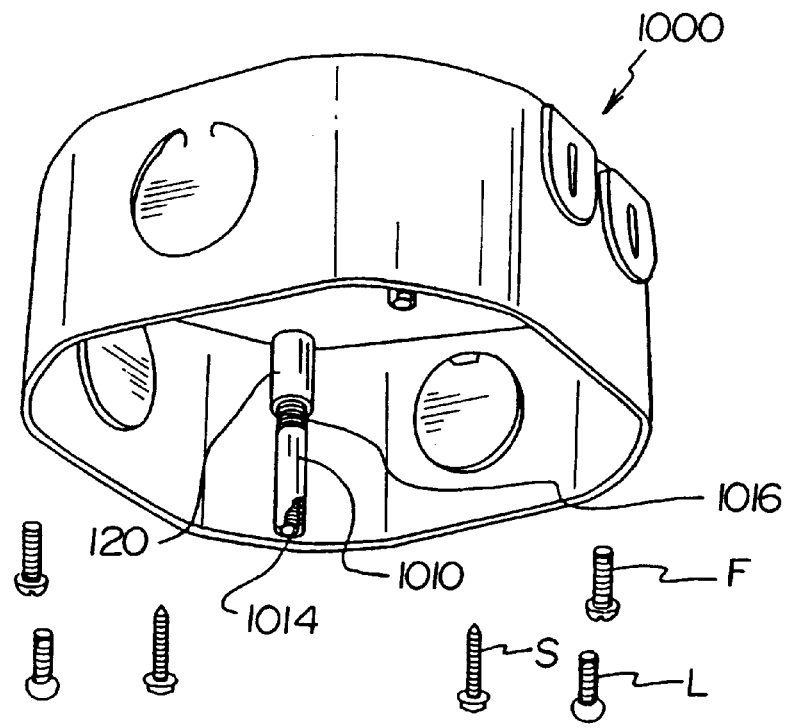
FIG. 46 is a perspective view of a still further preferred embodiment of a junction box according to the invention.
Figure 47:
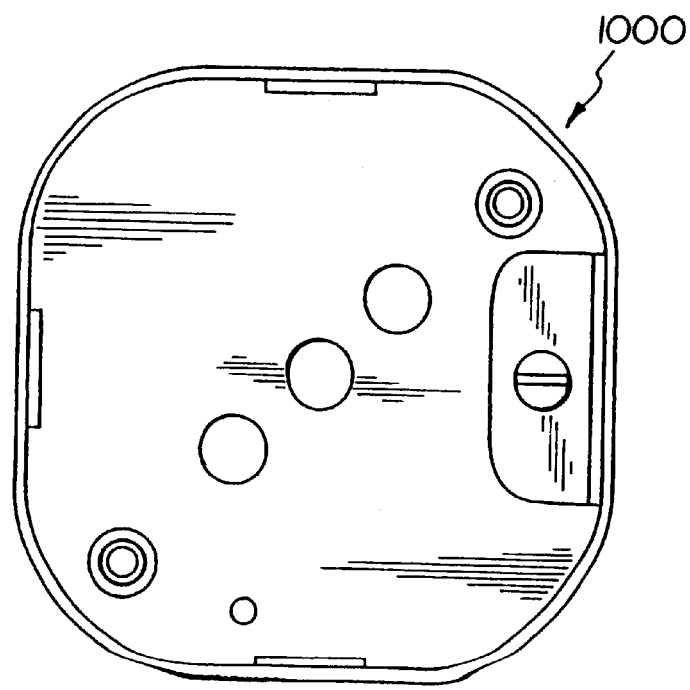
FIG. 47 is a bottom view of the preferred embodiment of FIG. 46.

FIGS. 46 and 47

FIGS. 46 and 47 illustrate a further still preferred embodiment of a junction box 1000 according to the invention.

Junction box 1000 is similar to junction box 100 of FIG. 10.

For example, box 1000 may include reinforcing or locking element 120 of box 100 of FIG. 10 that is used for securely attaching fixture support 1010 to the remainder of box 1000. Internal threads 1014 may be provided at a lower portion of fixture support 1010, and external threads 1016 may be provided at one or more locations thereon. As in the embodiment of FIG. 44, external threads 1016 may be used for securing an additional fastening element, such as a lock nut, or portions of an electrical fixture to be supported by box 1000, in use.

VARIATIONS

It is contemplated that all the features of the various embodiments may be interchanged, as appropriate, and as discussed above. For example, the embodiments of FIGS. 28 and 33 may be constructed as elongated pairs of vertically spaced apart plates, as taught by the junction box 200 of FIG. 13.

Figure 18:
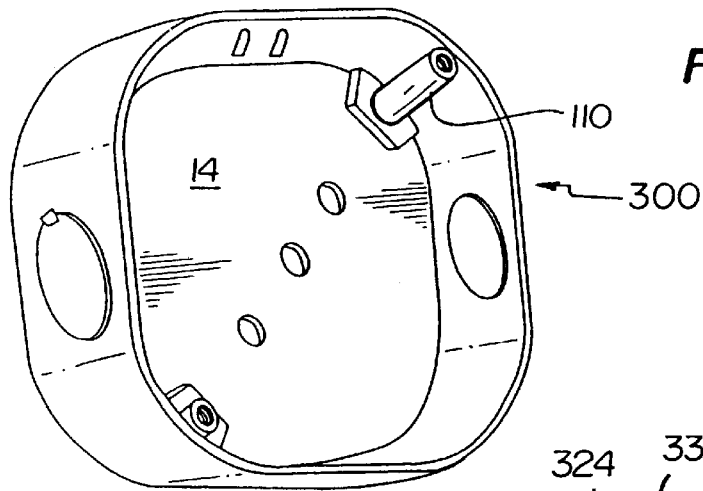
FIG. 18 is a perspective view of another preferred embodiment of a junction box according to the invention.

The openings or holes in each of the preferred embodiments that receive fixture fasteners 40, 50 and 110 therethrough, may be provided with side openings therein, such as side opening 338 provided on locking element 320 of the embodiment of FIG. 18.

Those are merely examples of the manner in which the various components and features of the preferred embodiments may be substituted for or added together, depending on the intended use.

It is contemplated that in all the embodiments of the invention, the fixture supports and the related strengthening components, for example, may all be disposed on the interior of or the exterior of cavity C.

It has been found that for intended uses where relatively large static and dynamic forces are expected, fewer knurlings/flutes each extending outwardly of support 40 generally resist such forces better than more knurlings having a shorter length extending outwardly of the remainder of stud 40 for similar applications.

In addition to or instead of the supports and/or studs used in the various embodiments, it is expected that locking coupling nuts will be used to attach the fixture supports to the junction box, as well as any other means of fastening supports to the junction box in a sufficiently secure manner so as to achieve the objects of the invention.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, non-metallic materials, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
a) an electrical box;
b) said electrical box including a top wall and a downwardly extending side wall defining a cavity therein;
c) a hole provided in said top wall;
d) a fixture support extending through said hole and into said cavity;
e) said fixture support including a body;
f) said body extending into said cavity;
g) a reinforcement element disposed adjacent said fixture support;
h) knurling disposed between said body and said reinforcement element for fastening said reinforcement element and said body together and for restricting movement of said body relative to said reinforcement element and to said top wall; and
i) said reinforcement element being disposed adjacent said top wall for reinforcing the engagement of said fixture support with said top wall for restricting movement of said fixture support relative to said top wall and for securing said fixture support to said top wall.

2. A mounting assembly as defined in claim 1, wherein:
a) said reinforcement element is disposed inside the cavity.

3. A mounting assembly, comprising:
a) an electrical box;
b) said electrical box including a top wall and a downwardly extending side wall defining a cavity therein;
c) a hole provided in said top wall;
d) a fixture support extending through said hole and into said cavity;
e) said fixture support including a body;
f) said body extending into said cavity;
g) a reinforcement element disposed adjacent said fixture support;
h) a friction surface disposed between said body and said reinforcement element for fastening said reinforcement element and said body together and for restricting movement of said body relative to said reinforcement element and to said top wall;
i) said reinforcement element being disposed adjacent said top wall for reinforcing the engagement of said fixture support with said top wall for restricting movement of said fixture support relative to said top wall and for securing said fixture support to said top wall;
j) said fixture support including a free end disposed at a distance from said head;
k) threads being provided on said free end of said fixture support; and
l) said threads including internal threads.

4. A mounting assembly as defined in claim 3, wherein:
a) said reinforcement element includes a cylinder.

5. A mounting assembly as defined in claim 3, wherein:
a) said reinforcement element engages a lower face of said top wall.

6. A mounting assembly, comprising:
a) an electrical box;
b) said electrical box including a top wall and a downwardly extending side wall defining a cavity therein;
c) a hole provided in said top wall;
d) a fixture support extending through said hole and into said cavity;
e) said fixture support including a head, said head extending at least partially outwardly of said hole for engaging said top wall;
f) said fixture support including a body;

g) said body extending into said cavity;
h) a reinforcement element disposed adjacent said fixture support;
i) a friction surface disposed between said body and said reinforcement element for fastening said reinforcement element and said body together and for restricting movement of said body relative to said reinforcement element and to said top wall;
j) said friction surface including knurling provided on said fixture support; and,
k) said reinforcement element being disposed adjacent said top wall for reinforcing the engagement of said fixture support with said top wall for restricting movement of said fixture support relative to said top wall and for securing said fixture support to said top wall.

7. A mounting assembly as defined in claim 6, wherein:
a) said friction surface is disposed on said body for engaging said top wall and for restricting movement of said body relative to said top wall.

8. A mounting assembly as in claim 6, wherein:
a) said head is disposed outside said cavity.

9. A mounting assembly as defined in claim 6, wherein:
a) said reinforcement element is disposed inside the cavity.

10. A mounting assembly as defined in claim 9, wherein:
a) said reinforcement element is disposed directly adjacent to said top wall.

11. A mounting assembly as defined in claim 6, wherein
a) said reinforcement element is disposed directly adjacent to said top wall.

12. A mounting assembly as defined in claim 6, wherein:
a) said fixture support includes a free end disposed at a distance from said head; and
b) threads are provided on said free end of said fixture support.

13. A mounting assembly as defined in claim 12, wherein:
a) said threads include internal threads.

14. A mounting assembly as defined in claim 6, wherein:
a) said knurling on said fixture support is sufficiently large for engaging said reinforcement element.

15. A mounting assembly as defined in claim 6, wherein:
a) an adhesive is provided on said top wall of said electrical box; and
b) said adhesive is sufficiently strong for adhering said electrical box to a support surface.

16. A mounting assembly as defined in claim 15, wherein:
a) said adhesive includes a piece of double-sided tape.

17. A mounting assembly as defined in claim 6, wherein:
a) said reinforcement element includes a cylinder.

18. A mounting assembly as defined in claim 6, wherein:
a) said reinforcement element includes a plate.

19. A mounting assembly as defined in claim 6, wherein:
a) a further fixture support is provided; and
b) said reinforcement element includes a plate which extends between said fixture support and said further fixture support.

20. A mounting assembly as defined in claim 6, wherein:
a) said reinforcement element includes a first plate and a spaced apart second plate, each of which engage and lock said fixture support.

21. A mounting assembly as defined in claim 18, wherein:
a) said plate has a face which engages an inner surface of said side wall for preventing fixture support movement toward said side wall.

22. A mounting assembly as defined in claim 6, wherein:
a) said reinforcement element includes a plate; and
b) said plate includes an opening for receiving said body therein.

23. A mounting assembly as defined in claim 22, wherein:
a) said plate includes a side wall; and
b) a further opening is provided in said side wall of said plate, and said further opening opens into said opening.

24. A mounting assembly as defined in claim 23, wherein:
a) said side wall of said plate is configured for abutting an inner surface of said side wall of said electrical box.

25. A mounting assembly, comprising:
a) an electrical box;
b) said electrical box including a top wall and a downwardly extending side wall defining a cavity therein;
c) a hole provided in said top wall;
d) a fixture support extending through said hole and into said cavity;
e) said fixture support including a head, said head extending at least partially outwardly of said hole for engaging said top wall;
f) said fixture support including a body;
g) said body extending into said cavity;
h) said fixture support including a free end disposed at a distance from said head;
i) threads being provided on said free end of said fixture support;
j) said threads including internal threads;
k) a reinforcement element disposed adjacent said fixture support;
l) a friction surface disposed between said body and said reinforcement element for fastening said reinforcement element and said body together and for restricting movement of said body relative to said reinforcement element and to said top wall; and
m) said reinforcement element being disposed adjacent said top wall for reinforcing the engagement of said fixture support with said top wall for restricting movement of said fixture support relative to said top wall and for securing said fixture support to said top wall.

26. A mounting assembly as defined in claim 25, wherein:
a) an adhesive is provided on said top wall of said electrical box; and
b) said adhesive is sufficiently strong for adhering said electrical box to a support surface.

27. A mounting assembly, comprising:
a) an electrical box;
b) said electrical box including a top wall and a downwardly extending side wall defining a cavity therein;
c) a hole provided in said top wall;
d) a fixture support extending through said hole and into said cavity;
e) said fixture support including a head, said head extending at least partially outwardly of said hole for engaging said top wall;
f) said fixture support including a body;
g) said body extending into said cavity;
h) a reinforcement element disposed adjacent said fixture support;
i) a friction surface disposed between said body and said reinforcement element for fastening said reinforcement element and said body together and for restricting movement of said body relative to said reinforcement element and to said top wall;

j) said reinforcement element being disposed adjacent said top wall for reinforcing the engagement of said fixture support with said top wall for restricting movement of said fixture support relative to said top wall and for securing said fixture support to said top wall; and, k) said reinforcement element including a first plate and a spaced apart second plate, each of which engage and lock said fixture support.

28. A mounting assembly, comprising:

a) an electrical box;

b) said electrical box including a top wall and a downwardly extending side wall defining a cavity therein;

c) a hole provided in said top wall;

d) a fixture support extending through said hole and into said cavity;

e) said fixture support including a head, said head extending at least partially outwardly of said hole for engaging said top wall;

f) said fixture support including a body;

g) said body extending into said cavity;

h) a reinforcement element disposed adjacent said fixture support;

i) said reinforcement element including a plate;

j) said plate having a face which engages an inner surface of said side wall for preventing fixture support movement toward said side wall;

k) a friction surface disposed between said body and said reinforcement element for fastening said reinforcement element and said body together and for restricting movement of said body relative to said reinforcement element and to said top wall; and l) said reinforcement element being disposed adjacent said top wall for reinforcing the engagement of said fixture support with said top wall for restricting movement of said fixture support relative to said top wall and for securing said fixture support to said top wall.

29. A mounting assembly, comprising:

a) an electrical box;

b) said electrical box including a top wall and a downwardly extending side wall defining a cavity therein;

c) a hole provided in said top wall;

d) a fixture support extending through said hole and into said cavity;

e) said fixture support including a head, said head extending at least partially outwardly of said hole for engaging said top wall;

f) said fixture support including a body;

g) said body extending into said cavity;

h) a reinforcement element disposed adjacent said fixture support;

i) said reinforcement element including a plate;

j) said plate including an opening for receiving said body therein;

k) said plate including a side wall;

l) a further opening is provided in said side wall of said plate, and said further opening opens into said opening;

m) a friction surface disposed between said body and said reinforcement element for fastening said reinforcement element and said body together and for restricting movement of said body relative to said reinforcement element and to said top wall; and n) said reinforcement element being disposed adjacent said top wall for reinforcing the engagement of said fixture support with said top wall for restricting movement of said fixture support relative to said top wall and for securing said fixture support to said top wall.

30. A mounting assembly as defined in claim 25, wherein:

a) said side wall of said plate is configured for abutting an inner surface of said side wall of said electrical box.

31. A mounting assembly, comprising:

a) an electrical box;

b) said electrical box including a top wall and a downwardly extending side wall defining a cavity therein;

c) a hole provided in said top wall;

d) a fixture support extending through said hole and into said cavity;

e) said fixture support including a body;

f) said body extending into said cavity;

g) a reinforcement element disposed adjacent said fixture support;

h) said fixture support being sufficiently smooth for preventing wear to insulation of an insulation-coated wire located in said electrical box during use;

i) said reinforcement element being sufficiently smooth for preventing wear to insulation of an insulation-coated wire located in said electrical box during use;

j) said reinforcement element being substantially free of threads;

k) said reinforcement element including an opening configured to accept said fixture support;

l) a friction surface disposed between said body and said reinforcement element for fastening said reinforcement element and said body together and for restricting movement of said body relative to said reinforcement element and to said top wall; and, m) said friction surface including threads provided on said fixture support.

32. A mounting assembly as defined in claim 31, wherein:

a) said reinforcement element is disposed adjacent said top wall for reinforcing the engagement of said fixture support with said top wall for restricting movement of said fixture support relative to said top wall and for securing said fixture support to said top wall.

33. A mounting assembly as defined in claim 31, wherein:

a) said friction surface is disposed on said body for engaging said top wall and for restricting movement of said body relative to said top wall.

34. A mounting assembly as defined in claim 31, wherein:

a) said friction surface is provided on said reinforcement element.

35. A mounting assembly, comprising:

a) an electrical box;

b) said electrical box including a top wall and a downwardly extending side wall defining a cavity therein;

c) a hole provided in said top wall;

d) a fixture support extending through said hole and into said cavity;

e) said fixture support including a body;

f) said body extending into said cavity;

g) a reinforcement element disposed adjacent said fixture support;

h) said fixture support being sufficiently smooth for preventing wear to insulation of an insulation-coated wire located in said electrical box during use;

i) said reinforcement element being sufficiently smooth for preventing wear to insulation of an insulation-coated wire located in said electrical box during use;

j) said reinforcement element including an opening configured to accept said fixture support;

k) a friction surface disposed between said body and said reinforcement element for fastening said reinforcement element and said body together and for restricting movement of said body relative to said reinforcement element and to said top wall; and, l) said friction surface being provided on said reinforcement element.

* * * * *